(12) United States Patent
Follestad et al.

(10) Patent No.: US 6,545,105 B1
(45) Date of Patent: Apr. 8, 2003

(54) MULTISTAGE POLYMERIZATION PROCESS USING A CATALYST HAVING DIFFERENT CATALYTICALLY ACTIVE SITES

(76) Inventors: Arild Follestad, Damstien 10, N-3960 Stathelle (NO); Klaus Joachim Jens, Kjaerlighetsstien 19, N-3970 Stathelle (NO); Kjell-Arne Solli, Vesteraasveien 67, N-3960 Stathelle (NO); Svein Nenseth, Gisholtveien 584, N-3739 Skien (NO)

( * ) Notice: Subject to any disclaimer, the term of this patent is extended or adjusted under 35 U.S.C. 154(b) by 0 days.

(21) Appl. No.: 09/457,575

(22) Filed: Dec. 9, 1999

Related U.S. Application Data

(63) Continuation of application No. PCT/GB98/01756, filed on Jun. 16, 1998, now abandoned.

(30) Foreign Application Priority Data

Jun. 16, 1997 (GB) ............................................ 9712663

(51) Int. Cl.[7] .............................. C08F 4/52; C08F 4/64; C08F 4/642
(52) U.S. Cl. ........................ 526/65; 526/113; 526/114; 526/118; 526/119; 526/160; 526/943
(58) Field of Search ........................... 526/65, 113, 114, 526/118, 119

(56) References Cited

U.S. PATENT DOCUMENTS

| | | | |
|---|---|---|---|
| 4,740,550 A | | 4/1988 | Foster |
| 4,740,551 A | | 4/1988 | Foster |
| 5,240,894 A | | 8/1993 | Burkhardt et al. |
| 5,442,018 A | * | 8/1995 | Cann et al. .................. 526/65 |
| 5,468,810 A | | 11/1995 | Hayakawa et al. |
| 5,496,782 A | | 3/1996 | Zandona |
| 5,624,877 A | | 4/1997 | Bergmeister et al. |
| 5,719,235 A | | 2/1998 | Zandona |
| 5,763,349 A | | 6/1998 | Zandona |
| 2001/0044506 A1 | * | 11/2001 | Mehta et al. .................. 526/65 |

FOREIGN PATENT DOCUMENTS

| | | |
|---|---|---|
| DE | 44 26 569 A1 | 2/1995 |
| EP | 373 660 A2 | 6/1990 |
| EP | 400 333 A2 | 12/1990 |
| EP | 416 379 A2 | 3/1991 |
| EP | 546 690 A1 | 6/1993 |
| EP | 597 461 A2 | 5/1994 |
| EP | 0 602 716 A1 | 6/1994 |
| EP | 603 723 A1 | 6/1994 |
| EP | 605952 A2 * | 7/1994 |
| EP | 613 908 A1 | 9/1994 |
| EP | 0 733 650 A1 | 9/1994 |
| EP | 619 325 A1 | 10/1994 |
| EP | 628 574 A1 | 12/1994 |
| EP | 714 923 A1 | 6/1996 |
| EP | 0 763 550 A1 | 3/1997 |
| EP | 770629 A2 * | 5/1997 |
| EP | 0 763 550 B1 | 5/1999 |
| WO | WO 88/02376 A1 | 4/1988 |
| WO | WO 92/15619 * | 9/1992 |
| WO | WO 92/15619 A1 | 9/1992 |
| WO | WO 96/35729 A1 | 11/1996 |

* cited by examiner

*Primary Examiner*—David W. Wu
*Assistant Examiner*—R. Rabago
(74) *Attorney, Agent, or Firm*—Karen Lee Orzechowski; Liniak, Berenato & White

(57) ABSTRACT

The invention relates to a process for the preparation of an olefin polymer wherein olefin polymerization is effected in a plurality of polymerization reaction stages in the presence of an olefin polymerization catalyst material, characterized in that said catalyst material comprises at least two different types of active polymerization sites.

15 Claims, 13 Drawing Sheets

US 6,545,105 B1

MULTISTAGE POLYMERIZATION PROCESS USING A CATALYST HAVING DIFFERENT CATALYTICALLY ACTIVE SITES

CROSS-REFERENCE TO RELATED APPLICATIONS

This application is a Continuation of the U.S. designation of International Application No. PCT/GB98/01756, now abandoned.

BACKGROUND OF THE INVENTION

This invention relates to a process of addition polymerization, especially olefin polymerization, and in particular to a multistage polymerization process effected using a multi-site polymerization catalyst.

The molecular weight distribution (MWD) of a polymer affects the properties of the polymer, in particular its mechanical strength and processability. Mechanical strength to a large extent is determined by the high molecular weight fraction and processability to a large extent is determined by the low molecular weight fraction. The mechanical strength moreover can be manipulated by the inclusion of n-olefin comonomers, with it thus being possible to vary the nature and relative content of the side chains so introduced. This is particularly important for the high molecular weight portion of the broad MWD polymer, e.g. a PE polymer, and thus the comonomer content of the high molecular weight portion may typically be greater than that in the low molecular weight portion which latter may be a homopolymer. Accordingly polymers with a broad or multimodal (e.g. bimodal) MWD find many uses as for example in blow moulding, films, pipes, etc., where a combination of strength and processability is particularly important.

Certain olefin polymerization catalysts are generally less suitable for the single stage preparation of polymers for such uses because the MWD for the polymers they produce is too narrow and as a result the polymer may be difficult to process.

The preparation of broad MWD olefin polymers is described for example in EP-A-310734, EP-A-128045 and NO-923334.

BRIEF SUMMARY OF THE INVENTION

Thus broad MWD olefins can be made in a dual reactor system (e.g. as described in NO-923334) using a variety of transition metal catalysts, e.g. Ziegler catalysts. The broad MWD results in this case from the processing conditions in the different reactors favouring the production of different molecular weight polymers, e.g. one favouring the production of a higher molecular weight polymer and a second favouring production of a lower molecular weight polymer. Broad MWD polyolefins may also be produced in a single reactor using either catalyst mixtures or multisite catalysts, ie. within the same process conditions the different catalysts or different catalytic sites favour production of polymers of different molecular weights. This arises since the different catalytic sites may have significantly different propagation/termination rates for olefin polymerization (see for example EP-A-310734).

In addition to being used in processes with essentially a single reactor, such multisite catalysts may be used in processes with several reactors, for example, where the reactor conditions are so adjusted that polymers with approximately the same characteristics are made in several of these reactors.

We have now found that the MWD of a polyolefin can be particularly effectively tailored to suit the needs of the user of the polyolefin, e.g. the producer of blow moulded objects, cables, tubes and pipes, etc., if polymerization is effected in at least two reaction stages using a catalyst material, generally a particulate material, that contains at least two different types of active polymerization sites. Typically such a catalyst material may contain a particulate multi-site component together with, in a liquid phase, co-catalysts and adjuvants.

Thus viewed from one aspect the invention provides a process for the preparation of an olefin polymer wherein olefin polymerization is effected in a plurality of polymerization stages, optionally in a plurality of polymerization reactors, in the presence of an olefin polymerization catalyst material, characterized in that said catalyst material comprises at least two different types of active polymerization sites.

The reactor used in one stage of the process may be used in a subsequent polymerization stage. Where the process of the invention is effected in a single reactor vessel, polymerization stages will conveniently be effected using different monomer/comonomer mixtures and optionally different process conditions (ie. temperature, pressure, reaction time, etc.).

It is particularly preferred that no one of the reaction stages used in the process of the invention be used to produce more than 95% by weight of the overall polymer, more particularly no more than 90%, especially no more than 85%, more especially no more than 78% and most especially no more than 70%. Thus if a prepolymerization is effected to produce a catalyst-polymer material for use in the process of the invention, that process will generally involve the use of at least two more reaction stages, such stages producing more than 93% by weight, preferably more than 96% by weight, particularly preferably more than 98% by weight of the polymer material. In the absence of prepolymerization, the process of the invention will involve at least two reaction stages capable of producing up to and including 100% by weight of the polymer material. Preferably however, at least 10% by weight of the total polymer should be made in each stage.

Furthermore it is especially preferred that at least two different reactants selected from monomer, comonomer and hydrogen be used in at least two of the reaction stages whereby at least one of the catalytic sites is caused to produce a different polymer in two different reaction stages. In this way, the tailoring of the high molecular weight end of the molecular weight distribution discussed below can be achieved.

DETAILED DESCRIPTION OF THE INVENTION

Figure 1:
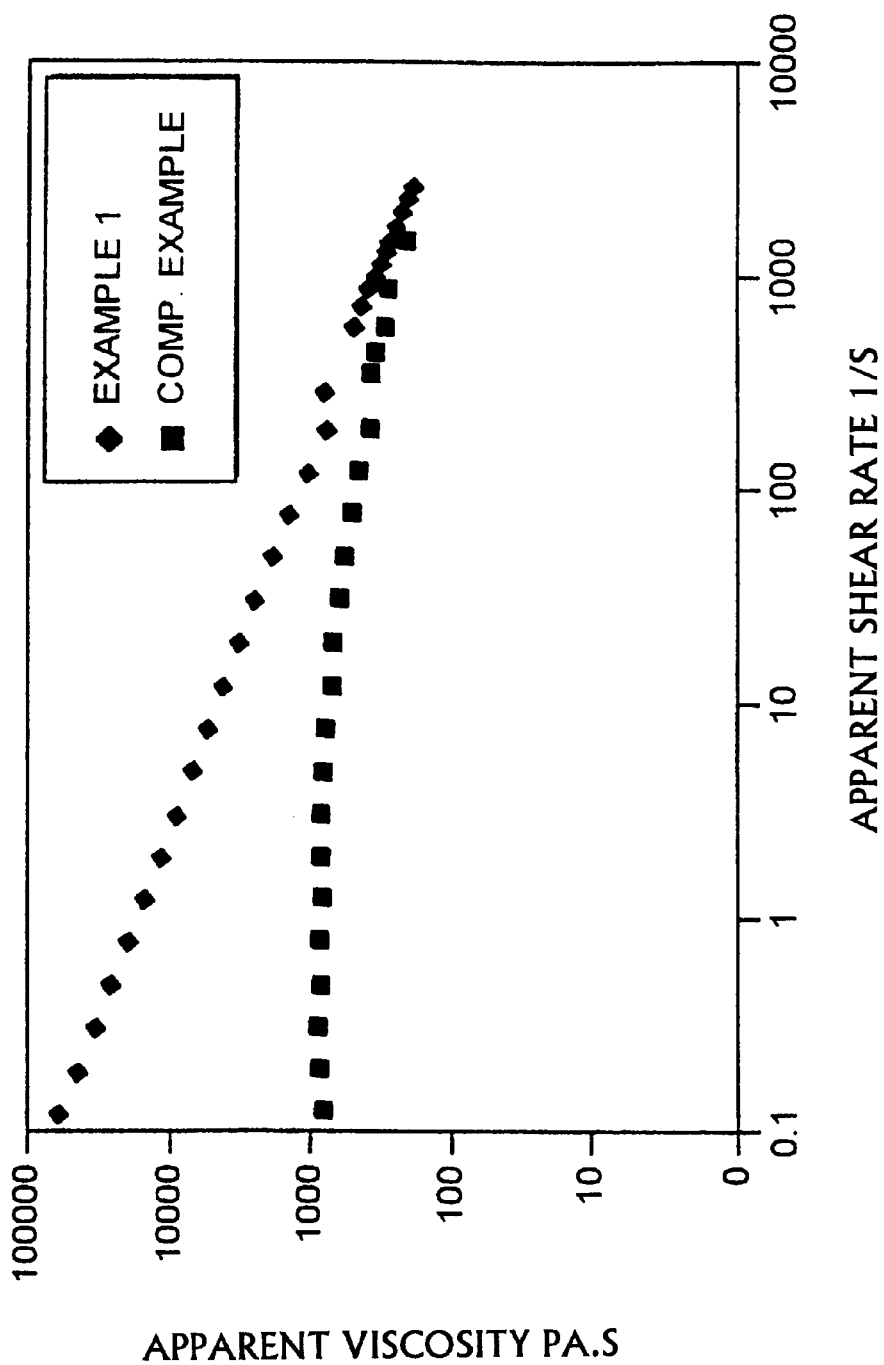
FIG. 1 depicts a graph comparing the apparent viscosity vs. apparent shear for the products of Example 1 (invention) and Example 2 (comparative)
Figure 2:
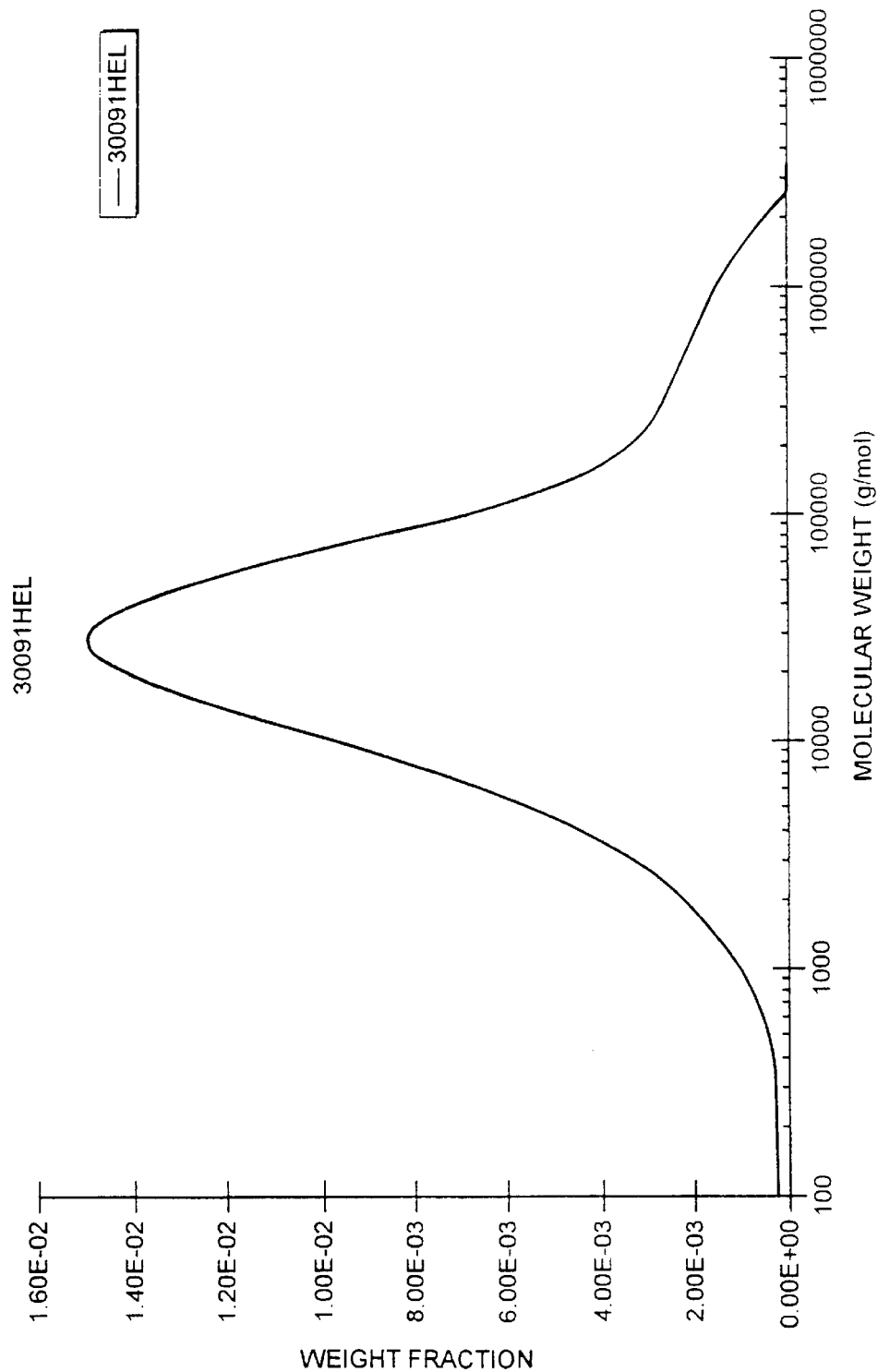
FIG. 2 depicts a graph showing the weight fraction vs. molecular weight for 30091HEL.
Figure 3:
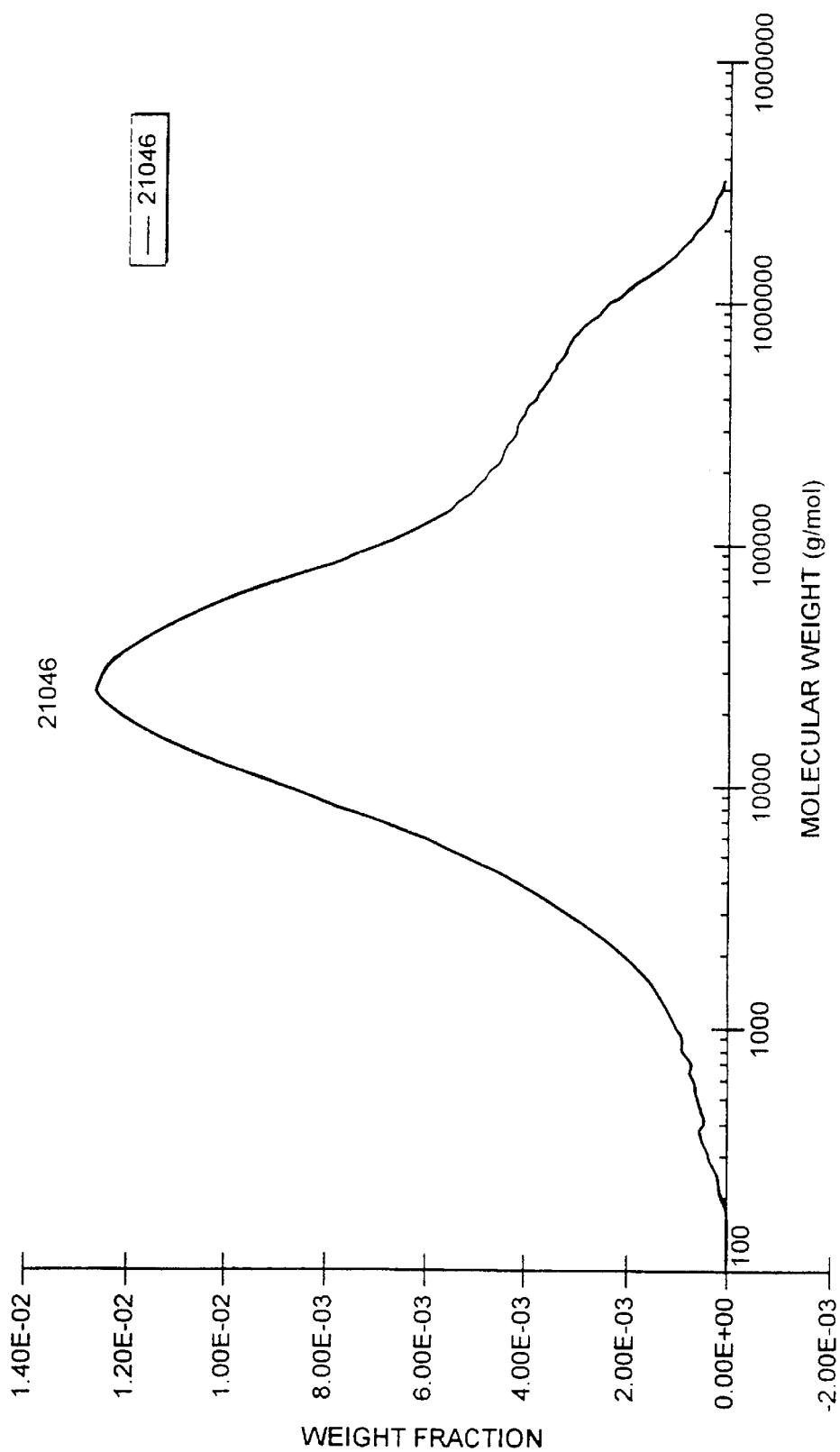
FIG. 3 depicts a graph showing the weight fraction vs. molecular weight for 21046.
Figure 4:
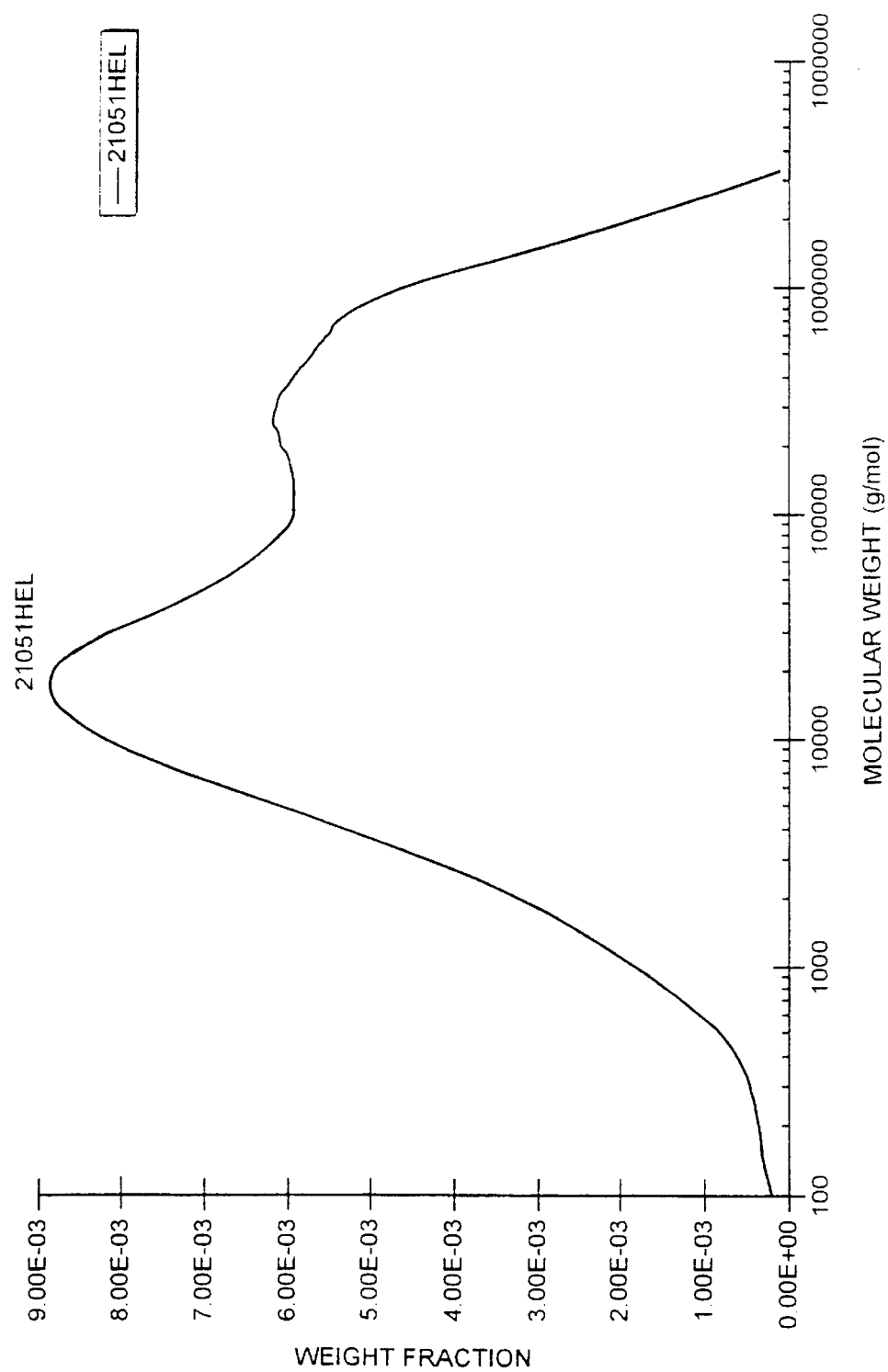
FIG. 4 depicts a graph showing the weight fraction vs. molecular weight for 21051HEL.
Figure 5:
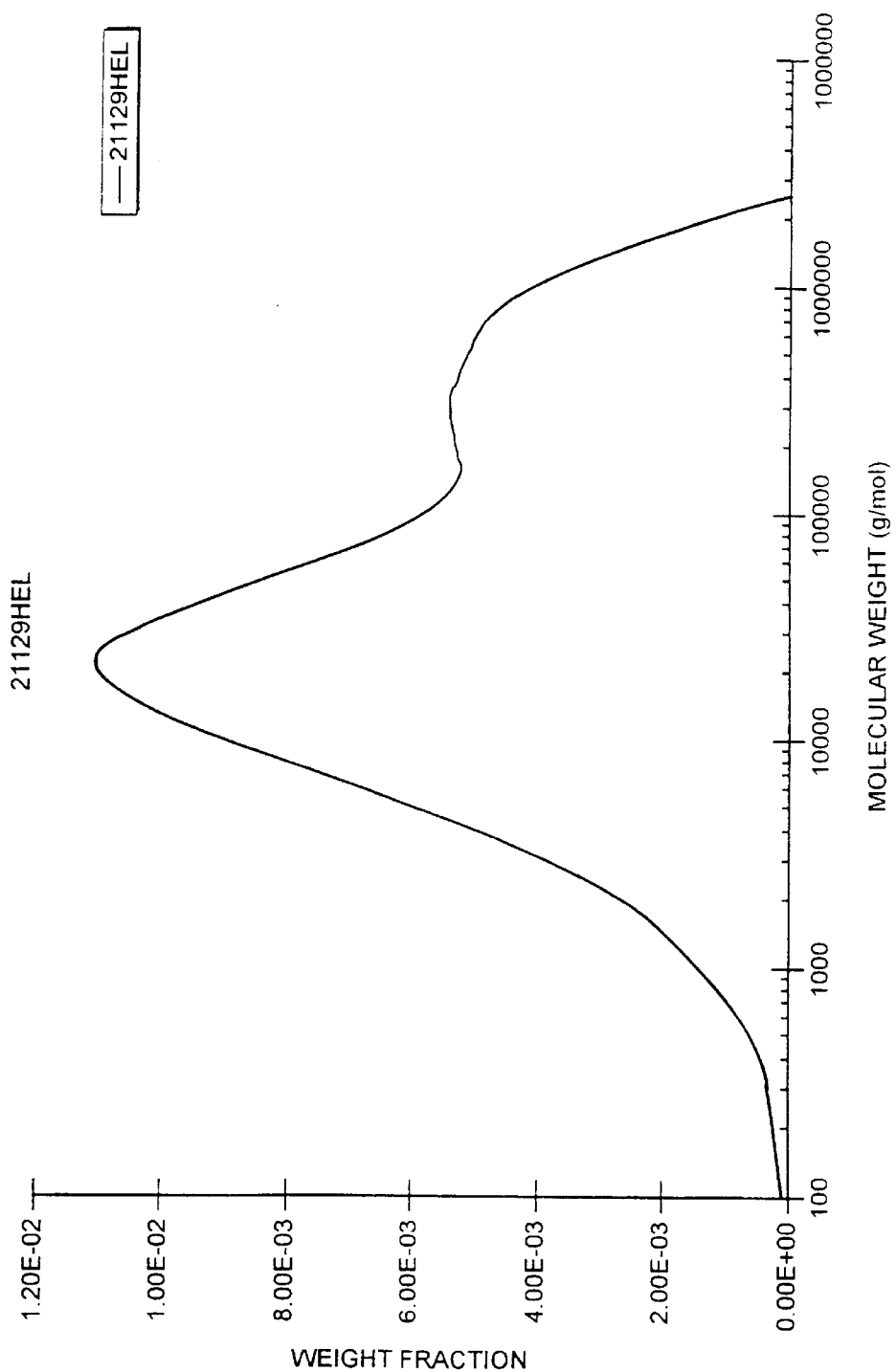
FIG. 5 depicts a graph showing the weight fraction vs. molecular weight for 21129HEL.
Figure 6:
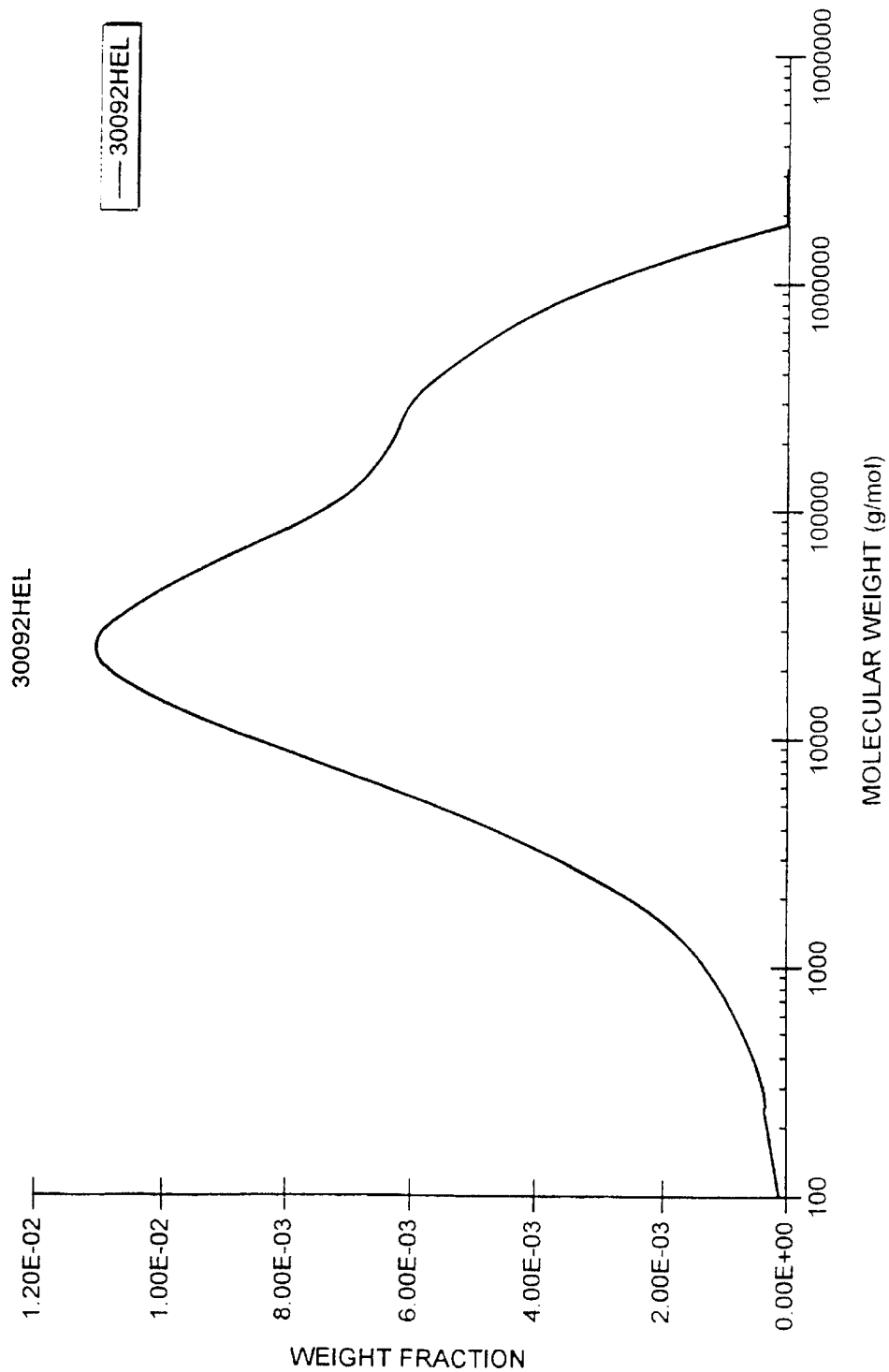
FIG. 6 depicts a graph showing the weight fraction vs. molecular weight for 30092HEL.
Figure 7:
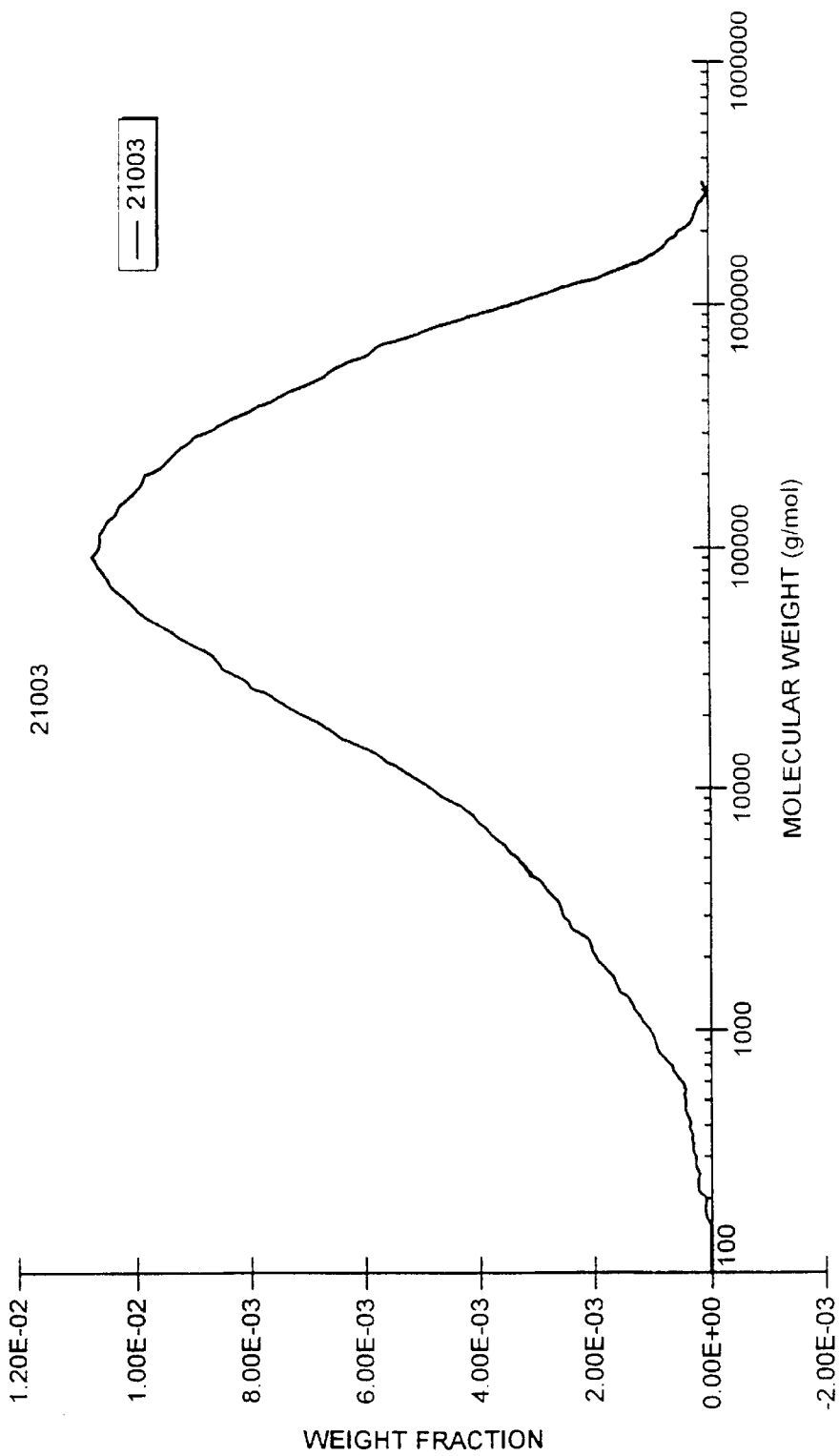
FIG. 7 depicts a graph showing the weight fraction vs. molecular weight for 21003.
Figure 8:
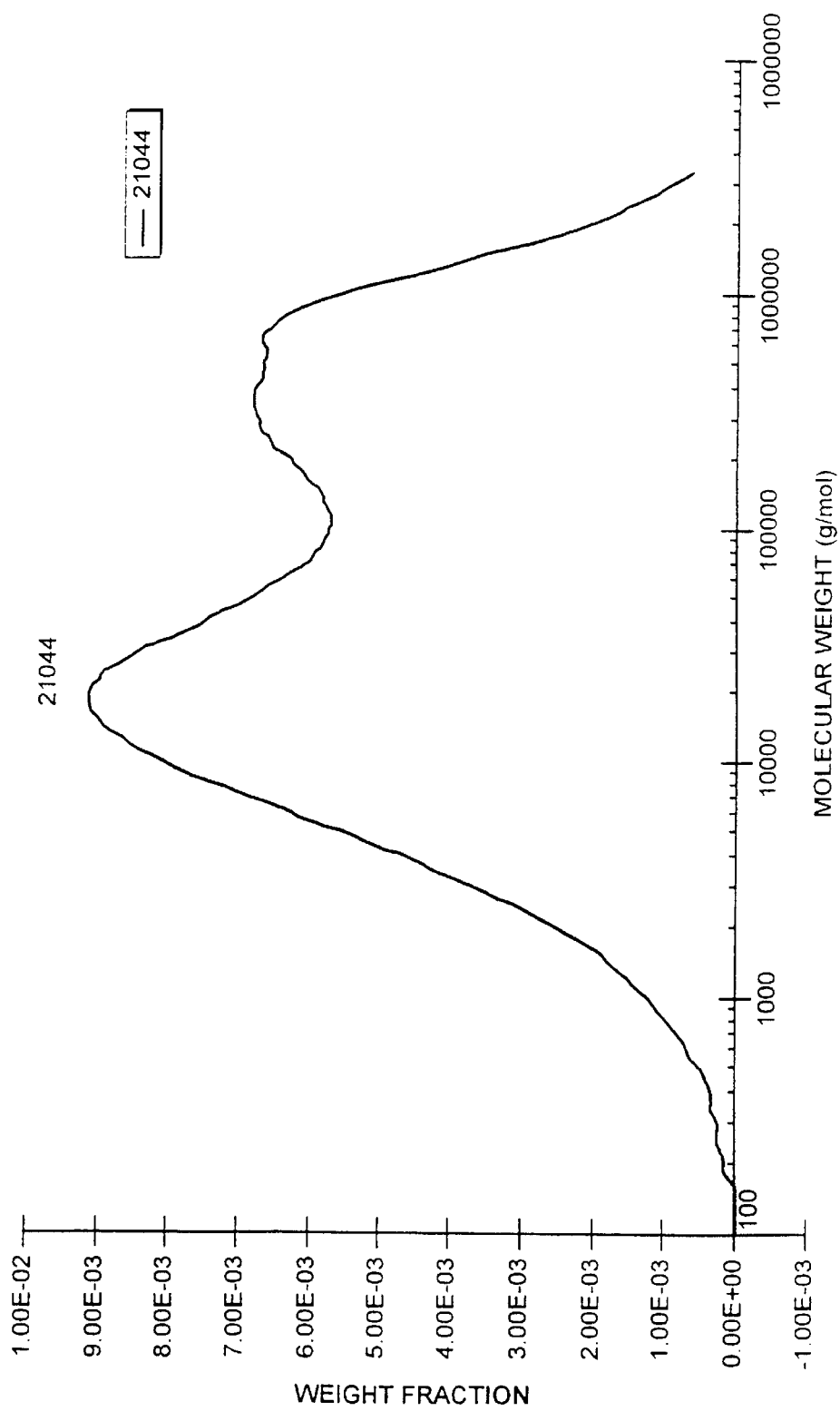
FIG. 8 depicts a graph showing the weight fraction vs. molecular weight for 21044.
Figure 9:
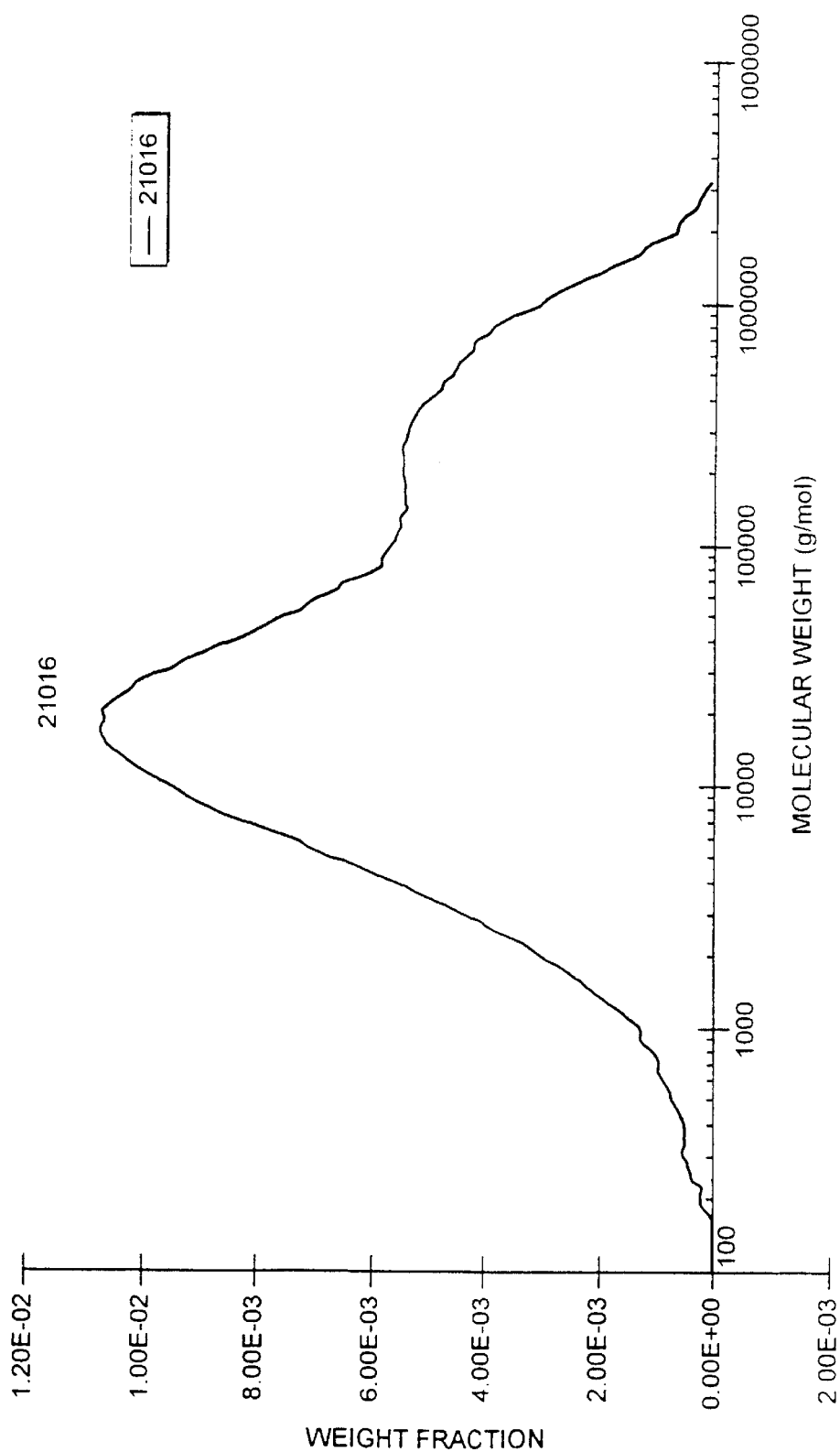
FIG. 9 depicts a graph showing the weight fraction vs. molecular weight for 21016.
Figure 10:
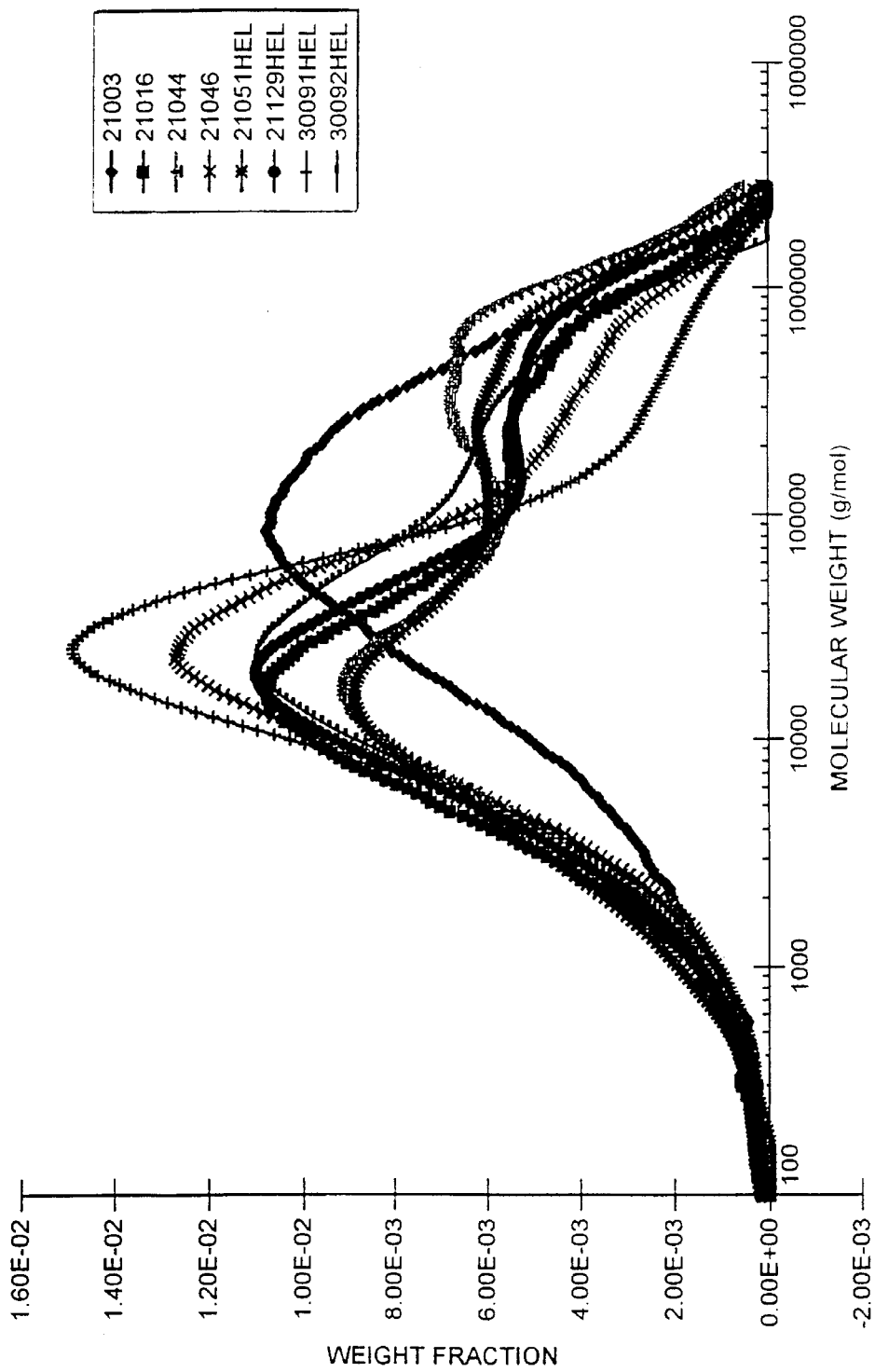
FIG. 10 depicts a graph comparing the weight fraction vs. molecular weight for the compounds of FIGS. 2–9.
Figure 11:
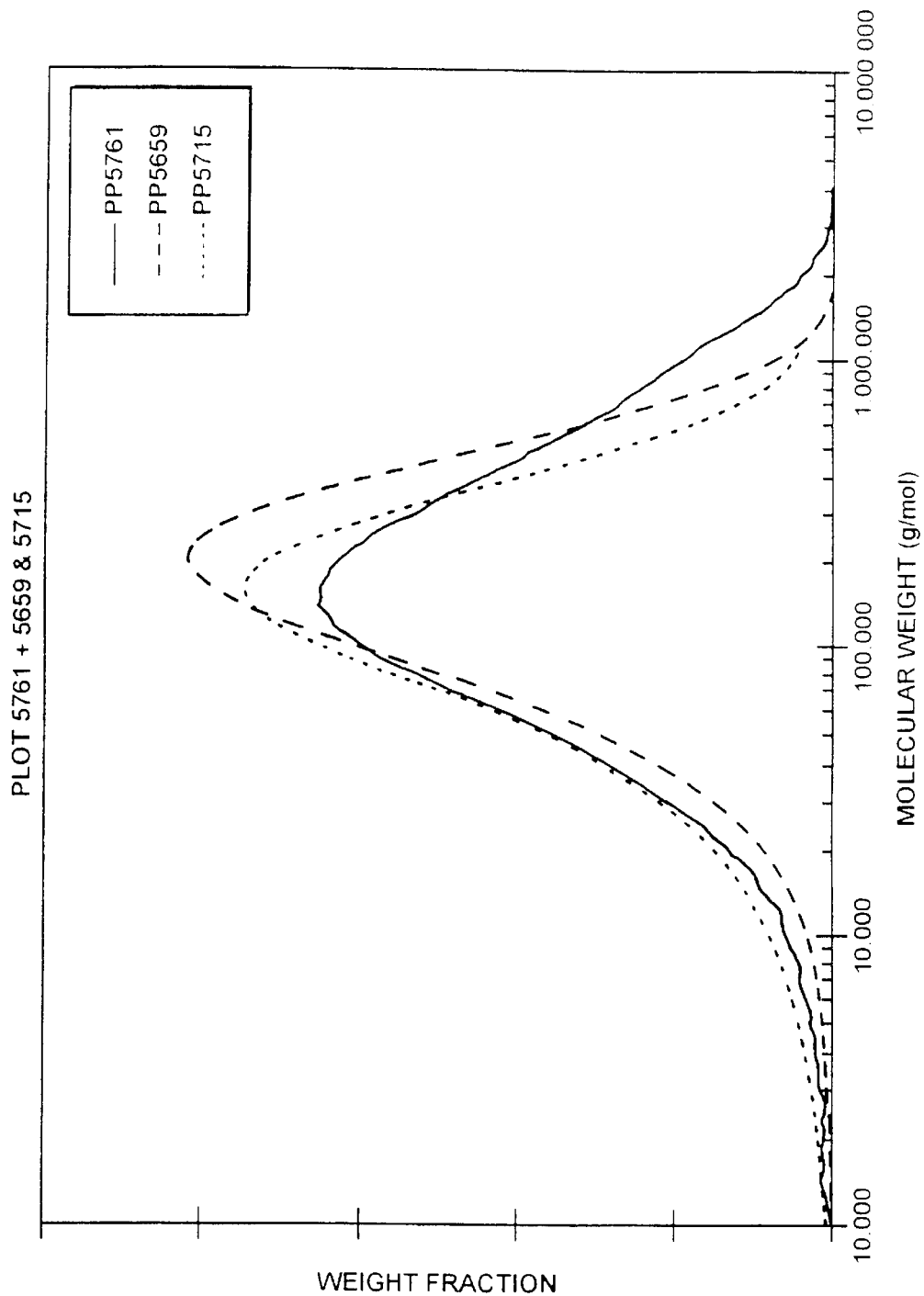
FIG. 11 depicts a graph comparing the weight fraction vs. molecular weight for PP5671, PP5659, and PP5715.
Figure 12:
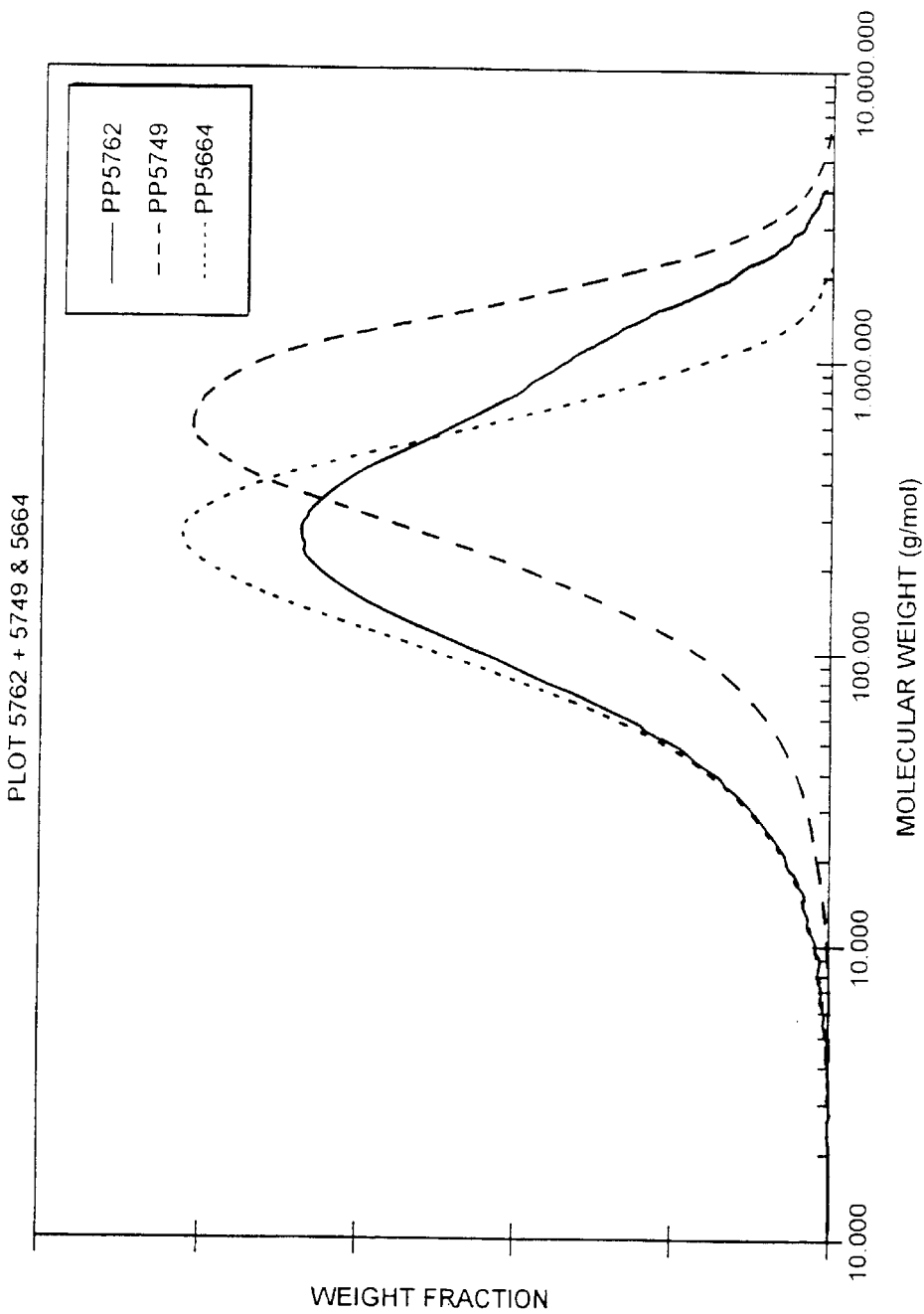
FIG. 12 depicts a graph comparing the weight fraction vs. molecular weight for PP5672, PP5649, and PP5664.
Figure 13:
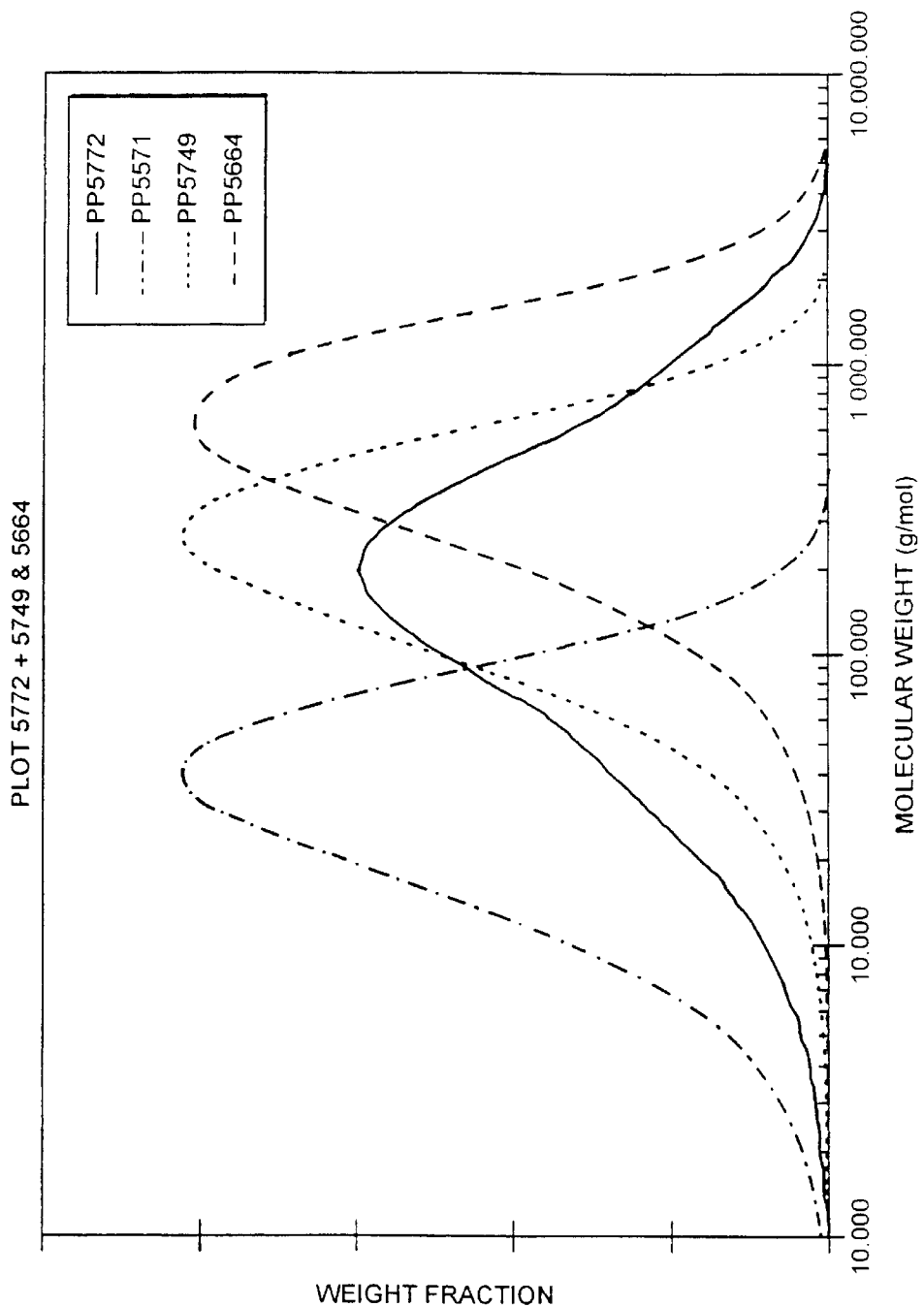
FIG. 13 depicts a graph comparing the weight fraction vs. molecular weight for PP5772, PP5571, PP5749 and PP5664.

In each reaction stage, the different types of active polymerization sites on the catalyst material will generate polymers of different molecular weight distribution, in other words the resulting polymer will be an intimately mixed polymer mixture, e.g. having a multimodal or broad molecular weight distribution or otherwise containing two intermingled populations of polymers with different properties. By using a multiplicity of polymerization reactors a control of a multimodal molecular weight distribution may be achieved using the process of the invention which cannot be achieved in a single reactor using a catalyst system even with four or more active polymerization sites.

The process of the invention involves effecting polymerization in a plurality of (i.e. at least two) reaction stages. The reactors used may be conveniently be any of the conventionally used polymerization reactors, e.g. reactors for solution polymerization, slurry tank or slurry loop polymerization or gas phase polymerization, etc. The polymer product of an early stage (e.g. the first) may be passed on to the subsequent (e.g. second) reactor on a continuous, semi-continuous or batchwise basis. In a semi-continuous process, a batch of the reaction mixture is extracted from one reactor and passed to the next reactor at a regular interval which is less than the overall average residence time for the first reactor, e.g. batches may be removed every minute even though the overall residence time is one hour. Each reactor will conveniently be provided with means for supplying monomer into the reactor and the overall multi-reactor structure will preferably be provided with means for recycling diluents, fluidizing gas or monomer into one or more of the individual reactors. Typically the process of the invention will be a multistage solution polymerization process or a process using a combination of two or more of the reactor types mentioned above, e.g. a combination of a loop and a gas-phase reactor such as that described in Norwegian Patent Application No. 923334. Preferably the process of the invention should use only particle forming reactors such as slurry and gas phase reactors or solution phase reactors. The total number of reactors used will depend on the catalyst system used and the molecular weight distribution desired for the polymer end product. Typically 2 to 5, preferably 2 or 3, most preferably 2 reactors will be used.

For slurry reactors, the reaction temperature will generally be in the range 60 to 110° C. (e.g. 85–110° C.), the reactor pressure will generally be in the range 5 to 80 bar (e.g. 25–65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions, especially in loop reactors.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. If the gas phase reactor is not the first reactor to be used in the process, the residence time can be further decreased to 0.25 hours. The gas used will commonly be a non-reactive gas such as nitrogen together with monomer (e.g. ethylene or propylene).

For solution phase reactors, the reaction temperature used will generally be in the range 130 to 27° C., the reactor pressure will generally be in the range 20 to 400 bar and the residence time will generally be in the range 0.1 to 1 hour. The solvent used will commonly be a hydrocarbon with a boiling point in the range 80–200° C.

The process of the invention is for the polymerization of olefins, in particular alpha-olefins and mixtures thereof, e.g. $C_{2-10}$ α-olefins such as ethylene, propene, but-1-ene, n-hex-1-ene, 4-methyl-pent-1-ene, n-oct-1-ene, etc. The process is particularly effective for the preparation of polyethylene and polypropylene as well as copolymers of ethylene with one or more copolymerizable monomers, e.g. $C_{3-20}$ mono and dienes, more preferably $C_{3-10}$ α-olefin monomers and copolymers of propene with one or more copolymerizable monomers, e.g. $C_{4-20}$ mono and dienes, more preferably $C_{4-10}$ α-olefin monomers or ethylene.

The process of the invention is particularly suited to producing polypropylene homopolymers, polypropylene random copolymers, the homopolymer component of a heterophasic copolymer which also include polymers with high ethylene content such as ethylene/propylene rubber and low density polyethylene.

Preferably the polymer product has ethylene as the major monomer, ie. at least 50% by number monomer residues being of ethylene, more preferably at least 50% by weight being ethylene residues.

The catalyst material used in the method of the invention is characterized by having different types of active polymerization sites having a significantly different ratio between propagation and termination rates for olefin polymerization and/or different degree of tacticity (for polypropylene) and/or different degree of incorporation of comonomer. The catalyst material thus conveniently comprises at least two different catalysts. These can be selected from all types of catalysts capable of olefin polymerization, e.g. Ziegler catalysts (which term encompasses Ziegler-Natta catalysts), metallocene catalysts, chromium catalysts and other organometallic or coordination catalysts and the different catalysts may be of the same or different types, e.g. Ziegler plus metallocene, metallocene plus metallocene, Ziegler plus Ziegler, organometallic plus metallocene, etc. Preferably the catalyst comprises two or more cyclopentadienyl-containing organometallic compounds, e.g. metallocenes.

Where one catalysts type in the catalyst material used in the process of the invention is a Ziegler catalyst it is especially preferred that at least one non-Ziegler catalyst type also be present, e.g. a metallocene.

The catalyst material may include one or more cocatalysts, catalyst activators or catalyst precursors, ie. the catalyst material may contain substances which react together to create a substance possessing the active polymerization site. Examples of these co-catalysts, catalyst activators and catalyst precursors include aluminium tri-alkyls (e.g. triethylaluminium), aluminoxanes such as methylaluminoxane, cationic activators such as boron containing compounds, transition metal compounds (e.g. halogenide compounds), magnesium compounds, group II organometallic compounds, e.g. aluminium or boron based compounds. Such materials may be solids, liquids or may be in solution in a liquid phase of the catalyst material which may be a solution, a solid, a dispersion, a suspension, a slurry, etc.

Preferred aluminoxanes include $C_{1-10}$ alkyl aluminoxanes, in particular methyl aluminoxane (MAO) and aluminoxanes in which the alkyl groups comprise isobutyl groups optionally together with methyl groups. Such aluminoxanes may be used as the sole co-catalyst or alternatively may be used together with other co-catalysts. Thus besides or in addition to aluminoxanes other cation complex forming catalyst activators may be used. In this regard mention may be made of the silver and boron compounds known in the art. What is required of such activators is that they should react with the η-liganded complex to yield an organometallic cation and a non-coordinating anion (see for example the discussion on non-coordinating anions J in EP-A-617052 (Asahi)).

Aluminoxane co-catalysts are described by Hoechst in WO 94/28034. These are linear or cyclic oligomers having up to 40, preferably 3 to 20, [Al (R")O] repeat units (where R" is hydrogen, $C_{1-10}$ alkyl (preferably methyl and/or isobutyl) or $C_{6-18}$ aryl or mixtures thereof).

The catalyst material may be introduced into the first of the reactors used in the process of the invention as a single material containing all the components of the catalyst material or as two or more materials which together contain all of the components of the catalyst material or which together interact to generate the catalyst material. It is preferred to introduce the catalyst material as a single material which may be a solution, a solid, a dispersion, a suspension or a slurry, etc.

The catalyst material may if desired include a support, e.g. an inorganic or organic carrier material, preferably a solid particulate material and also preferably a porous material. Conventional catalyst support materials may be used in this regard, e.g. porous inorganic or organic materials, for example oxides such as silica, alumina, silica-alumina, silica with Ti, zirconia, etc., non-oxides such as magnesium halides, e.g. $MgCl_2$, aluminium phosphate, zeolites etc, and polymers such as polystyrene, polymethacrylate, polystyrene-divinylbenzene and polyolefins such as polyethylene and polypropylene.

Where an inorganic support material is used, this will preferably be treated, e.g. thermally or chemically to remove surface hydroxyl.

Where a support material is used, this will especially preferably be used to carry more than one type of catalytic site, ie. so that a particulate support will present two or more different active polymerization sites on the same particles.

Where different types of catalytic sites are present on the same carrier particles, it is preferred that the ratio between the different types of site be substantially uniform within the particles, ie. it is preferred that the ratio be the same on the surface as it is at different depths within the particles and that the ratio be substantially uniform between the particles.

Where a co-catalyst or catalyst activator is used, it will be especially preferred to have the activated catalyst system loaded onto a particulate support. Alternatively but less preferably the activatable catalytic site may be loaded onto a particulate support which is placed in a solution of the co-catalyst or activator.

Where co-catalysts or catalyst activators for different catalysts are used, it is preferred to load these and the catalysts onto a support simultaneously rather than sequentially. In this way the apparatus used is used more efficiently and the total time required for preparing the supported catalyst is reduced since sequential impregnation have a time-consuming further impregnation step. Sequential impregnation is thus a more complicated process and disadvantageously requires the use of more solvent. Moreover, in this way the catalysts and co-catalysts or activators are distributed more uniformly (relative to each other) in the support. As a result, properties of the resulting polymer products are enhanced.

More particularly the simultaneous loading of different catalysts upon a support results in the production, in a subsequent single or multistage polymerization, of a reactor powder (the polymer product of the polymerization process) which has good interparticle homogeneity, and a broad, e.g. bimodal, MWD. More especially, the homogeneity achieved is better than that achievable by simply using a mixture of supported catalysts, each carrying a single catalyst system, and the simultaneously multiply (e.g. dually) impregnated catalysts have high activity in terms of polymer production.

Viewed from a further aspect therefore the invention provides a process for the preparation of a supported catalyst, said process comprising contacting a porous particulate support material (e.g. silica, alumina, zirconia, magnesium chloride, etc.) with a solution comprising at least two different catalytically active materials or precursors therefor (e.g. procatalysts) and optionally comprising at least one co-catalyst or catalyst activator, and recovering said support material impregnated with said catalytically active materials or precursors or reaction products thereof with said co-catalyst or catalyst activator, preferably wherein the liquid content of said solution and said support material before contact thereof with said solution is less than 1.4, more preferably less than 1.2, most preferably less than 1.0 times the pore volume of said support material.

In this process, the support material may be used while it is partially impregnated with a non-aqueous liquid, e.g. a hydrocarbon (preferably a saturated or aromatic hydrocarbon). At least one, and preferably at least two of the catalysts or procatalysts preferably comprise η-liganded complexes as discussed herein.

The η-liganded complexes may be used together with Lewis acids, Bronstedt acids or Pearson acids, or additionally in the presence of Lewis bases.

Such Lewis acids are, for example, boranes or alanes, such as aluminium alkyls, aluminium halogenides, aluminium alkoxides, boron organyles, boron halogenides, boron acid esters or boron or aluminium compounds which contain both halogenide and alkyl or aryl or alkoxide substituents, and also mixtures thereof or the triphenylmethyl cation. Especially preferred are aluminium oxanes or mixtures of aluminium-containing Lewis acids with water. All acids work as ionising agents, according to modern knowledge, which form a metallocenium cation, load-compensated by a bulky, badly coordinating anion.

Furthermore, the invention relates to the reaction products of such ionising agents with η-liganded complexes.

Examples of such badly coordinating anions are, e.g. $B(C_6H_5)_4^\ominus$, $B(C_6F_5)_4^\ominus$, $B(CH_3)(C_6F_5)_3^\ominus$,

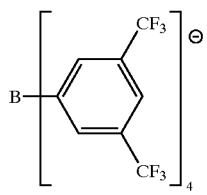

or sulphonates such as tosylate or triflate, tetrafluoroborates, hexafluorophosphates or antimonates, perchlorares, and also voluminous cluster molecule anions of the type of the carboranes, for example $C_2B_9H_{12}^{\ominus}$ or $CB_{11}H_{12}^{\ominus}$. If such anions are present, metallocene compounds can also work as highly-effective polymerisation catalysts even in the absence of aluminium oxane. This is primarily the case if an X-ligand represents an alkyl group or benzyl. However, it can also be advantageous to use such metallocene complexes with voluminous anions in combination with aluminium alkylenes such as $(CH_3)_3Al$, $(C_2H_5)_3Al$, $(n\text{-}/i\text{-}propyl)_3Al$, $(n\text{-}/t\text{-}butyl)_3Al$, $(i\text{-}butyl)_3Al$, the isomers pentyl, hexyl or octyl aluminium alkyl, or lithium alkylenes such as methyl-Li, benzyl-Li, butyl-Li or the corresponding Mg-organic compounds, such as Grignard compounds or Zn-organyls on the one hand, such metalalkyls transfer alkyl groups to the central metal, on the other hand they capture water or catalyst poisons from the reaction medium or monomer during polymerisation reactions. Examples of boron compounds from which such anions can be derived are:

triethylammonium-tetraphenylborate, tripropylammonium-tetraphenylborate, tri(n-butyl) ammonium-tetraphenylborate, tri(t-butyl)ammonium-tetraphenylborate N, N-dimethylanilinium-tetraphenylborate, N,N-diethylanilinium-tetraphenylborate, N,N-dimethyl(2,4,6-trimethylanilinium-tetraphenylborate, trimethylammonium-tetrakis(pentafluorophenyl) borate, triethylammonium-tetrakis(pentafluorophenyl) borate, tripropylammonium-tetrakis (pentafluorophenyl)borate, tri(n-butyl)ammonium-tetrakis(pentafluorophenyl)borate, tri(sec-butyl) ammonium-tetrakis(pentafluorophenyl) borate, N,N-dimethylanilinium-tetrakis(pentafluorophenyl)borate, N,N-diethylanilinium-tetrakis(pentafluorophenyl) borate, N,N-dimethyl(2,4,5-trimethylanilinium-tetrakis (pentafluorophenyl)borate, trimethylammonium-tetrakis(2,3,4,6-tetrafluorophenyl)borate, triethylammonium-tetrakis(2,3,4,6-tetrafluorophenyl) borate, tripropylammonium-tetrakis(2,3,4,6-tetrafluorophenyl)borate, tri(n-butyl)ammonium-tetrakis(2,3,4,6-tetrafluorophenyl)-borate, dimethyl)(t-butyl)ammonium-tetrakis(2,3,4,6-tetrafluorophenyl)-borate, N,N-dimethylanilinium-tetrakis(2,3,4,6-tetrafluorophenyl)-borate, N,N-diethylanilinium-tetrakis(2,3,4,6-tetrafluorophenyl)-borate, N,N-dimethyl-(2,4,6-trimethylanilinium)-tetrakis-(2,3,4,6-tetrafluorophenyl)-borate, dialkylammonium salts, such as:

di-(i-propyl)ammonium-tetrakis(pentafluorophenyl)-borate and dicyclohexylammonium-tetrakis (pentafluorophenyl)borate; tri-substituted phosphonium salts, such as: triphenylphosphonium-tetrakis (pentafluorophenyl)borate, tri (o-tolyl)phosphonium-tetrakis (pentafluorophenyl)-borate, tri(2,6-dimethylphenyl) phosphonium-tetrakis(pentafluorophenyl)-borate, triolylmethyl-tetrakis(pentafluorophenyl)borate, triphenylmethyl-tetraphenylborate(trityl-tetraphenyl-borate), trityl-tetrakis(pentafluorophenyl)borate, silver tetrafluoroborate, tris(pentafluorophenyl)borane, tris (trifluoromethyl)borane.

Co-catalysts are, for example, aluminiumoxane compounds.

These also include those of formula

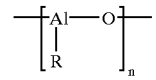

(XII)

wherein

R denotes $C_1$–$C_{20}$-alkyl, $C_6$–$C_{12}$-aryl or benzyl and
n is an integer from 2 to 50, preferably 10 to 35.

It is also possible to use a mixture of various aluminium oxanes or a mixture of their precursors (aluminium alkyls or alkylaluminium halogenides) in combination with water (in gaseous, liquid, solid or bound form, also as crystallised water). The water can also be supplied as (residual) dampness of the polymerisation medium, the monomer or a carrier such as silica gel.

The bonds which project from the square brackets of formula (XI) contain, as end groups of the oligomerous aluminium oxane, R groups or $AlR_2$-groups. These aluminium oxanes are generally present as a mixture of several of themselves with different chain lengths. Fine examination has also revealed aluminium oxanes with ring-formed or cagelike structure. Aluminium oxanes are commercial compounds. In the special case of $R=CH_3$, mention is made of methyl aluminium oxanes (MAO).

Other co-catalysts are aluminium alkyls, lithium alkyls or Mg-organic compounds such as Grignard compounds or partially-hydrolysed boron organyls. Aluminium oxanes are the preferred co-catalysts.

Activation with the co-catalyst, or production of the voluminous non- or weakly coordinating anion can take place in the autoclaves or in a separate reaction container (pre-forming). Activation can take place in the presence or absence of the monomers which are to be polymerised. Activation can be undertaken in an aliphatic or aromatic or halogenated solution or suspension medium, or on the surface of a catalyst carrier material.

The metallocene compounds and the aluminium oxanes can be used as such both in homogenous form and also individually or together in heterogenic form on carriers. Here, the carrier material can be of an anorganic or organic nature, such as silica gel, $Al_2O_3$, $MgCl_2$, NaCl, cellulose derivatives, starches and polymers. In doing this, either the metallocene compound or the aluminium oxane can firstly be placed on the carrier and then the other components can be added afterwards. In the same way, the metallocene compound can activate with the aluminium oxane in homogenous or heterogenous form, after which the activated metallocene compound can be placed on the carrier.

Carrier materials are preferably thermically and/or chemically pre-treated and the water content or the OH group concentration is to be set as defined or kept as low as possible. Chemical pre-treatment can e.g. comprise reaction of the carrier with aluminium alkyl. Anorganic carriers are usually heated to 100° C. to 1000° C. for 1 to 100 hours before use. The surface of such anorganic carriers, especially of silica ($SiO_2$) is between 10 and 1000 $m^2/g$, preferably between 100 and 800 $m^2/g$. Particle diameter is between 0.1 and 500 micrometers ($\mu$), preferably between 10 and 200 $\mu$.

Thus viewed from a further aspect the invention provides a process for the preparation of a supported catalyst, said process comprising reacting in the liquid phase (e.g. in solution) at least two η-liganded polymerization catalysts and a co-catalyst (e.g. an aluminoxane, preferably methylaluminoxane), and contacting the reaction product with a porous particulate support material (e.g. silica, alumina, zirconia, magnesium chloride, etc.) whereby to load said reaction product onto said support material. Support impregnation with the catalysts and any co-catalysts or catalyst activators may be performed as described in WO96/00245, WO95/11264, EP-A-619325 or, more preferably, WO95/12622. If desired, a prepolymerization may be effected, e.g. as described in U.S. Pat. No. 5,240,894, so that prepolymerized catalyst particles are used in the major polymerization stage(s).

Viewed from a further aspect the invention provides a supported catalyst, obtainable by a process as described in the preceding paragraph, comprising a porous particulate support material (preferably an inorganic oxide or halide or a polymer such as an acrylate) particles whereof carry at least two η-liganded catalyst:co-catalyst reaction products the distribution pattern whereof within said particles is substantially similar.

By substantially similar distribution patterns it is meant that the two η-liganded catalyst:co-catalyst (e.g. metallocene:MAO) products are essentially intermixed within the particles (rather than having one with a pattern of distributing relatively more to the outer extremities of the particles than does the other).

Suitable η-liganded catalysts are described below; however the η-liganded catalyst should preferably be such that the polymers they produce have different properties, e.g. molecular weight distributions or mean molecular weights. Preferably the combination used is of unbridged and bridged bis-η-liganded complexes of group 4, 5 or 6 metals, e.g. where the unbridged η-ligand complex is a metallocene with two homo or heterocyclopentadienyl ligands which are optionally ring substituted by fused or pendant substituent groups and the bridged η-ligand complex comprises two η-liganding groups joined by a 1 to 4 atom chain. One example of a metallocene combination would thus be (i) an unbridged biscyclopentadienyl Ti, Zr or Hf compound and (ii) a bridged bis-indenyl Ti, Zr or Hf compound, e.g. $Cp_2Zr$ $Cl_2$ and $CH_2CH_2(Ind)_2Zr$ $Cl_2$ or $Si(CH_3)$ $(Ind)_2ZrCl_2$. An alternative combination would be a dimethylsilylbis (fluorenyl) Ti, Zr or Hf complex (e.g. $SiMe_2$(fluorenyl) $ZrCl_2$) and a bis n-butylcyclopenta-dienyl Ti, Zr or Hf complex.

Such simultaneously loaded supported catalysts confer desirable properties on the polymer products of the polymerization processes they are used in. Accordingly, viewed from a further aspect, the invention provides a process for the preparation of an olefin polymer by a catalysed polymerization, characterized in that as a catalyst is used a supported catalyst produced by simultaneously loading at least two catalytically effective η-liganded compounds onto a porous particulate support material, preferably by loading at least two η-liganded catalyst:aluminoxane reaction products onto said support material.

Viewed from a further aspect the invention provides an olefin polymer obtainable by the process described in the preceding paragraph, and objects (e.g. containers, fibres, films, sheets, tubes, etc) fabricated therefrom.

Viewed from a yet still further aspect the invention provides the use of a supported catalyst produced by simultaneously loading at least two catalytically effective η-liganded catalyst compounds into a porous particulate support material (preferably by loading at least two η-liganded catalyst:aluminoxane reaction products onto said support material) as an olefin polymerization catalyst, preferably in a slurry phase polymerization reaction.

Such simultaneously loaded supported catalysts are preferably used in polymerization processes wherein olefin polymerization is effected in a plurality of polymerization reaction stages. However they may also be used in single stage or single reactor polymerizations.

Thus it will be recognized that the catalyst material used in the process of the invention is not limited to being of certain metal types but instead to being a combination of catalysts with certain affinity for comonomer incorporation and capable of producing polymers of appropriate molecular weights under the reaction conditions in the various polymerization reactors used in the process of the invention.

Examples of suitable catalyst types include the Ziegler catalysts disclosed in U.S. Pat. No. 5,151,397, the titanium and vanadium catalysts and zirconium metallocenes of EP-A-318048, the metallocene and aluminoxane catalysts of EP-A-206794, the mixed Ziegler-metallocene catalysts of EP-A-447070 (e.g. comprising zirconium metallocenes, titanium and/or vanadium halides, magnesium dichloride and optionally organo-aluminium compounds such as aluminoxanes), the bisindenyl metallocene mixtures of EP-A-643084, the metallocenes of EP-A-69951, the biscyclopentadienyl metallocenes of EP-A-410734, and the mixed metallocenes and aluminoxane catalysts of EP-A-128045.

In general η-liganded metal complexes are preferred as catalysts. By η-ligand is meant a ligand which coordinates the metal with η-orbital electrons. Metals may be complexed for example with 1, 2 or 3 η-ligands. Complexes of metals with two η-ligands are generally termed metallocenes. η-liganded complexes based on zirconium, hafnium and titanium are preferred as catalysts. The η-bonding ligands in such catalysts may be simple unsubstituted homo- or heterocyclopentadienyl rings, but preferably they will be optionally substituted fused ring systems (e.g. indenyl ligands), substituted cyclopentadienyl rings, optionally substituted bridged bis-cyclopentadienyl ligands or optionally substituted bridged bis fused ring systems (e.g. bis indenyl ligands). Suitable examples are discussed for example in EP-B-35242 (BASF), EP-B-129368 (Exxon) and EP-B-206794 (Exxon).

Examples of single site polymerization catalysts which may be included in the catalyst material used in the process of the invention in order to generate high molecular weight polymers include the metallocene compounds with a one or two atom long bridge joining the cyclopentadienyl rings, e.g. a ethylene bridge or a bridge $R_2X$ where X is carbon or silicon and R is alkyl, aryl, aralkyl, etc. (for example methyl, benzyl, etc group typically containing up to 10 carbons). Preferably, a ring position on the cyclopentadienyl rings adjacent the bridge attachment position is substituted, for example by an alkyl group such as methyl. The metal of the metallocene may conveniently be any group 3 to 6 metal, preferably zirconium or hafnium. Examples of such metallocenes include:

dimethyl-silyl{bis-(2-methyl-4-tert.butyl)}zirconium-dichloride;

dimethyl-silyl{bis-(2-methyl-4-phenylindenyl)}zirconium-dichloride;

dimethyl-silyl{bis-(2-methyl-4-naphthylindenyl)}zirconium-dichloride;

dimethyl-silyl{bis-(2-methyl-4,6-di-isopropylindenyl)}zirconium-dichloride;

dimethyl-silyl{bis-(2-methyl-4,7-dimethylindenyl)}zirconium-dichloride;

dimethyl-silyl{bis-(2-methyl-benz[e]-indenyl)}zirconium-dichloride;

dimethyl-silyl{bis-(fluorenyl)}zirconium-dichloride;

rac-[ethylenebis(2-(tert)-butyldimethylsiloxy)indenyl)]-zirconium-dichloride;

dimethyl-silyl{bis-(2-methyl-4-tert.butyl)}hafnium-dichloride;

dimethyl-silyl{bis-(2-methyl-4-phenylindenyl)}hafnium-dichloride;

dimethyl-silyl{bis-(2-methyl-4-naphthylindenyl)}hafnium-dichloride;

dimethyl-silyl{bis-(2-methyl-4,6-di-isopropyl-indenyl)}hafnium-dichloride;

dimethyl-silyl{bis-(2-methyl-4,7-dimethyl-indenyl)}hafnium-dichloride;

dimethyl-silyl{bis-(2-methyl-benze[e]indenyl)}hafnium-dichloride;

dimethyl-silyl{bis-(fluorenyl)}hafnium-dichloride; and rac-[ethylenebis(2-(tert)butyldimethylsiloxy)indenyl)]-hafnium-dichloride.

A further class of single site catalysts capable of producing high molecular weight polymers that may be included in the catalyst material used in the process of the invention are the n-bonding metal complexes of ligands which contain a η-bonding component (e.g. a cyclopentadienyl ring or an analog such as an indenyl ring) and a component (e.g. a side chain) capable of co-ordinating to the metal in a non η-bonding fashion.

The metal in such complexes will again conveniently be an ion of a group 3 to 6 metal, for example titanium or zirconium. Examples of such complexes include:

1,2,3,4-tetramethyl,5-(dimethylsilyl-{(tert)-butylamido)}(cyclopentadienyl)titanium-dichloride;

1,2,3,4-tetramethyl,5-(dimethylsilyl-{(tert)-butylamido)}(cyclopentadienyl)zirconium-dichloride; and 1,2,3,4-tetramethyl,5-(ethylene-{(tert)-butylamido)}(cyclopentadienyl)titanium-dichloride.

Another class of single site complexes producing high molecular weight polymers which may be used in the catalyst material comprises compounds having one cyclopentadienyl ligand in conjunction with another ligand; e.g. (cyclopentadienyl-hydrido-boro-trispyrazol)-zirconium dichloride. (Other such materials are disclosed in WO97/17379 (Borealis) and the publications referred to therein).

There are also metal complexes suitable for use as a high molecular weight producing catalyst that do not contain any cyclopentadienyl rings; e.g. {3,3'-methoxy, 1,1'-(tert)butyl-bi-phenoxy}titanium-di-benzyl.

In general such non ligand containing ligands joined onto the catalytic active metal through at least one nitrogen atom. Examples of state of the art complexes are given in G. G. Hlatky, et al proceedings of Metallocenes Europe 1998; Schotland Business Research, Inc. USA 1998.

Such complexes containing ligands bound to the catalytic active metal through at least one nitrogen atom may optionally contain one or more ligands in addition.

The single site catalyst that can be used in the catalyst material to generate lower molecular weight components of the overall polymer product may conveniently be a metallocene in which the cyclopentadienyl (or equivalent, e.g. indenyl, etc.) groups are not joined by a bridge or where the cyclopentadienyl rings are joined by a bridge but the ring positions adjacent the bridge attachment site are unsubstituted. Again the metal may be any group III to VI metal, e.g. zirconium. Example of such metallocenes include:

rac-ethylene-bis(1-indenyl)zirconium dichloride;

rac-ethylene-bis(4,5,6,7-tetrahydro-1-indenyl)zirconium dichloride;

bis(n-butylcyclopentadienyl)zirconium dichloride;

bis(1,2-dimethylcyclopentadienyl)zirconium dichloride;

bis (1,3-dimethylcyclopentadienyl)zirconium dichloride;

bis(4,7-dimethylindenyl)zirconium dichloride;

bis(1,2-ethyl,methylcyclopentadienyl)zirconium dichloride;

bisfluorenylzirconium dichloride;

bisindenylzirconium dichloride;

biscyclopentadienylzirconium dichloride; and bistetrahydroindenylzirconium dichloride.

All of the complexes mentioned above as suitable for the production of high and low molecular weight components of the overall polymer may be used in conjunction with an aluminoxane. Moreover equivalent complexes in which the halide is replaced by a hydrocarbon ligand (e.g. alkyls, aryls, aralkyls, allyls and alkenyls, e.g. with up to 10 carbons). In this case however the complexes need to be activated by a cationic activator such as a boron compound or an aluminoxane or a mixture of such activators. Alternatively the halides may be replaced by a pendant group which also contains an anionic function. In such case the catalytically active metal is in a cationic form resulting in a complex present in a zwitterionic form. Examples of such complexes are given in G. Erker et al, Macromolecules 1997, 30, 3955 and literature cited therein.

Where an aluminoxane is used, the catalyst material preferably contains a particulate support loaded with the interaction product of the metal complex and the aluminoxane.

Ziegler catalysts which may be used for the production of the catalyst material are catalysts which normally consist of (i) a transition metal compound, usually a halogenide, supported on a porous carrier, (ii) a metallorganic co-catalyst where the metal is a group II metal such as Al or B, and (iii) a magnesium compound. Ziegler catalysts are well known in the art. To produce increasingly higher molecular weight polymers, the transition metal in the Ziegler catalyst can be changed from titanium to zirconium to hafnium for example. In general where the catalyst material used in the process of the invention includes a Ziegler catalyst and a single site catalyst, the Ziegler catalyst will function to produce the higher molecular weight component of the overall polymer product.

The different types of catalyst sites in the catalyst material used in the process of the invention may be present in substantially equal numbers (ie. a mole ratio of 1:1, or 1:1:1, etc. for two or three catalyst-type systems). However one catalyst type may be predominant with other catalyst types being present at a relative mol. % of for example 1 to 100% (100% representing a 1:1 mole ratio), preferably 5 to 80%, especially 10 to 70%.

Generally the quantity of catalyst used will depend upon the nature of the catalyst, the reactor types and conditions and the properties desired for the polymer product. Conventional catalyst quantities, such as described in the publications referred to herein, may be used.

The process of the invention gives rise to polymer products with improved molecular weight distributions. The advantage of the products may be demonstrated by analysis of their rheology. This may be done (as described by Brydson in "Flow properties of polymers", Iliffe Books, London, 1970) by plotting apparent viscosity P against apparent shear rate 1/s.

The advantage of the products of the process of the invention as compared with a similar product made in a similar multistage reactor process but using just one of the catalysts is that for the product according to the invention if it has similar mechanical strength then it will have improved processability while if it has similar processability then it will have improved mechanical strength.

The process of the invention may be used with particular advantage to tailor the distribution of molecular weights in the higher molecular weight fraction of the overall polymer. Moreover this may be done in such a way as to include comonomer (providing side chains and as a result increased strength) in the high molecular weight fraction. The presence of a bimodal or multimodal distribution at the higher end of the molecular weights improves the ease of homogenization as the lower molecular weight component of the high molecular weight fraction reduces viscosity of the high molecular weight fraction. Without this low end to it the high molecular weight fraction gives rise to melt homogenization problems, thereby resulting in an inhomogeneous melt. Using the invention, the low molecular weight fraction can be produced in the first or early stage, conveniently with little or no inclusion of comonomer, while a bimodal high molecular weight fraction (with a sufficient relatively lower molecular weight component to prevent melt homogenization problems during subsequent processing and with an otherwise unacceptably high molecular weight higher molecular weight, strength giving, component) can be produced, generally with comonomer introduction, in a second or later stage.

Thus the process allows the user to tailor the placement of comonomer into the high molecular weight fraction of the polymer and also to tailor the molecular weight profile of the high molecular weight fraction of the polymer.

Viewed from a further aspect the invention provides polymers obtained by a polymerization process according to the invention.

The polymers produced using the catalysts or processes according to the invention have a number of beneficial properties relative to polymers produced using conventional techniques. In particular, for ethene homo and copolymers, the polymer product preferably has:

1. An extremely high FRR21/2 (ie. the ratio of MFR21 to MFR2). This is of benefit since the high shear viscosity is low. More particularly FRR21/2 is conveniently at least 160 and more preferably at least 220, e.g. 200 to 450 most preferably above 350. Ethene polymers having FRR21/2 of 200, preferably 220 to 450 form a further aspect of the invention.

2. A high activation energy for melt viscosity. This is of benefit as it shows the presence of long chain branching versus conventional commercial Ziegler ro chromium oxide made polyolefins, a high shear viscosity reducer. Typically such activation energies may be at least 7.5 more preferably at least 8.5 kcal/mol.

3. A higher proportion of the overall polymer is of lower rather than higher molecular weight. Typically, the low molecular weight fraction is 10–95%, preferably 20–90%, more preferably less than 50% still more preferably less than 40% and yet still more preferably less than 30% by weight of the overall polymer. This results in an improved balance of polymer properties.

4. Where a comonomer, e.g. but-1-ene or hex-1-ene, is used, this incorporates primarily into the longer rather than the shorter polymer chains so improving the mechanical and processing properties of the polymer product. Thus the ratio in the short chain branching factor (the number of branches (comonomers) per 1000 carbons) between the high and low molecular weight fractions of the polymer may typically be at least 3, preferably at least 5, most preferably at least 15.

5. The polymer product has a high degree of particle to particle homogeneity. The homogeneity of the polymer is often a matter of particular concern to end users since inhomogeniety may give rise to phenomena known as fish eyes, gels or white spots. This is particularly important for films but is also important for wires, cables, blow moulded products and black pipe.

The production of highly homogeneous multicomponent, e.g. bimodal, olefin polymers in a single polymerization stage has up to now been problematical. The use of simultaneous coimpregnation of catalyst support particles in the process of the invention to produce supported catalysts having two or more catalytic sites results in supported catalysts which can be used to produce highly homogeneous polymers in single or multistage polymerizations, particularly highly homogeneous bimodal polymer powders.

Thus viewed from a further aspect the invention provides a polyolefin powder, preferably an ethene homo or copolymer, comprising at least two polymer components A and B produced by polymerization catalysed by polymerization catalysts having at least two different catalytic sites, preferably a supported catalyst comprising both such catalysts, where component B has a higher weight average molecular weight than component A and the ratio of the molecular weight of the peak in the molecular weight distribution of component B to that of component A is at least 10, preferably at least 15, more preferably at least 20, most preferably at least 25 and where at least 80 wt %, preferably at least 90 wt % of the largest particles (i.e.those in the largest 10 wt % fraction of said polyolefin powder) has a $S_{log10}M_W$ less than 0.25, preferably less than 0.2, most preferably less than 0.15.

Advantageously, the catalysts used should be η-liganded metal complexes, e.g. homo or heterocyclopenta-dienyl liganded complexes as discussed herein. Moreover the proportion of components A and B in the overall polymer is preferably at least 10 wt % each and at least 80 wt % in sum. Furthermore it is preferred that at least 90 wt % of the polymer is prepared in a single polymerization stage, ie. under essentially similar process conditions.

Viewed from a yet still further aspect the invention provides a polyolefin powder, preferably an ethene homo or copolymer, comprising at least two polymer components A and B produced by a continuous polymerization process (e.g. a polymerization catalysed by polymerization catalysts having at least two different catalytic sites, preferably a supported catalyst comprising both such catalysts) where component B has a higher weight average molecular weight than component A and the ratio of the molecular weight of the peak in the molecular weight distribution of component B to that of component A is at least 10, preferably at least 15, more preferably at least 20, most preferably at least 25 and where at least 80 wt %, preferably at least 90 wt % of the largest particles (i.e. those in the largest 10 wt % fraction of said polyolefin powder) has a $S_{log10}M_W$ less than 0.25, preferably less than 0.2, most preferably less than 0.15.

Such polymer powders have higher homogeneity than powders produced by mixing two separate singly impregnated supported catalyst.

Viewed from further aspect the invention provides a process for the preparation of such polymers using such catalysts in a single or multistage polymerization as well as the use of such polymers, optionally after formulation with additives (e.g. filters, colors, antistatic agents, carbon black, stabilizers, antioxidants, plasticizers, etc.) and extrusion and/or grinding and/or pelletization, for the preparation of films, fibres, pipes or moulded products or for cable or wire applications.

Polyolefins prepared according to the invention, preferably polyethylenes, have a gradient of −0.2 or less, preferably −0.3 or less, especially −0.4 or less, particularly −0.5 or less, e.g. −0.25 to −1.0, in the plot of log apparent viscosity (Pa.s) against log apparent shear rate ($s^{-1}$) in the range of apparent shear rate from 0.1 to 100 $s^{-1}$, and preferably with an apparent viscosity of at least 1000 Pa.s in at least part of this range.

Viewed from a still further aspect the invention also provides the use of an olefin catalyst, catalyst activator, or catalyst precursor for the manufacture of a catalyst material comprising a particulate carrier material particles whereof carry at least two different types of active polymerization sites, for use in a process-according to the invention.

All of the documents referred to herein are hereby incorporated by reference.

The invention will now be described further with reference to the following non-limiting Examples.

Parameter Determination

Apparent viscosity vs apparent shear rate was measured on a capilliary rheometer (Rosend Advanced Rheometer) at 190° C.

MFR's: Melt flow rate (melt index) measured at 190° C. MFR2: with 2.16 kg load. MFR5: with 5 kg load. MFR21: with 21.6 kg load.

FRR's: FRR21/2=MFR21/MFR2.

Mw, Mn, MWD: Measured by GPC—Gel permeation chromatography. Mw: weight average molecular weight. Mn: Number average molecular weight.

Component peak MW's are found from the MWD curve from GPC.

The MWD from a GPC measurement is by convention presented as a curve in a diagram where:
the abscissa is the log (MW) (MW is molecular weight)
the ordinate is the dW.MW /d(MW)) W is mass or mass fraction of polymer.

At very low and very high MW values, the ordinate value usually is low or zero. At some intermediate MW thee is at least one maximum point.

A polymer made in one polymerization step under non-changing process conditions with a catalyst that is not specifically aimed at containing more than one type of active site, usually makes a polymer with one maximum only. Usually the distribution then resembles a normal (Gaussian) distribution with a linear (non-logathmic) abscissa. However, when the catalyst system is prepared so that several types of active sites occur giving much different MW's, or the polymerization conditions is changed in steps so that the steps give very different MW's, then this gives rise to more complicated MWD curves with either more than one maximum or at least one maximum and one shoulder, each maximum and each shoulder originating from one polymer component as described before. By studying such a MWD curve, one can identify the approximate MWD's of the components and estimate each components' approximate maximum. Such a maximum is a component peak MW.

The $Slog_{10}M_W$ of the polymer sample is calculated as follows:

$$Slog_{10}Mw = \sqrt{\frac{\sum_{i=1}^{n}(\log_{10}Mwi - \log_{10}Mwav)^2}{n-1}}$$

where $$\log_{10}Mwav = \frac{\sum_{i=1}^{n}(\log_{10}Mwi)}{n}$$

In this equation, $M_{wi}$ is Weight Average molecular weight of the i'th particle. The total number of particles measured is n.

EXAMPLE 1

Catalyst Preparation

The catalyst was prepared in a glove box into a septabottle. Magnetic stirrer was used as a mixer. The following chemicals were used:

0.006 g (n-BuCp)$_2$ZrCl$_2$
0.008 g (SiMe$_2$ (2-Me, 4-Ph Ind)$_2$ZrCl$_2$*
1.2 ml 30% MAO (Albemarle)
0.3 ml toluene
(n-BuCp=n-butylcyclopentadienyl 2-Me,4-Ph-Ind=2-methyl-4-phenyl-indenyl MAO=methylaluminoxane)
* in the rac form The chemicals were added together and stirred for half an hour. Impregnating was made dropwise on 1.0 g Sylopol 55SJ silica-carrier using pore filling method. Catalyst was stirred and dried with nitrogen-flow.

Polymerization

Polymerization was carried out in a 2L reactor, 1L isobutane was used as medium. Polymerization temperature 85° C. and ethylene partial pressure 14 bar. Total pressure was maintained at 29 bar.

A multistage polymerization process was effected with polymerization in two steps:
Step 1 isobutane with 0.18 wt % hexene and ethylene with 2350 ppm H$_2$;
Step 2 isobutane with 6 wt % hexene and ethylene without H$_2$.

Catalyst was fed into the reactor with isobutane and the reactor was heated up to the polymerization temperature. Ethylene feeding was started at 75° C. The first step was stopped after 40 minutes by flashing out both isobutane and ethylene. The second step was started by adding isobutane with 6% hexene and then heating it up to the desired temperature again. Ethylene feeding was started the same way as in step 1. This polymerization step was effected for 20 minutes and was stopped by flashing the hydrocarbons out from the reactor.

EXAMPLE 2 COMPARATIVE

The catalyst was prepared according to the procedure of Example 1 using the following amount of chemicals:

11 mg (n-BuCp)$_2$ZrCl$_2$
1.1 ml 30% MAO (Albemarle)
0.4 ml toluene
1.0 g Sylopol 55SJ SiO2

Polymerization was conducted according to Example 1.

Polymer Product

The apparent viscosity vs apparent shear rate for the products of Example 1 (diamond) and Example 2 (square)

are shown in FIG. 1 of the accompanying drawings. The apparent shear rate gives an indication at what shear rates the product will show unstable flow; the apparent viscosity increases with the molecular weight of the polymer.

EXAMPLE 3

Catalyst Preparation (A) Sylopol 55SJ (a porous silica from Grace Davison) was calcined at 600° C. in dry air for 20 hours. The calcined product has a pore volume of 1.55 mL/g.

An impregnation solution was prepared by mixing with magnetic stirring at ambient temperature in a small glass vessel in a nitrogen filled glove box:

(nBuCp)$_2$ ZrCl$_2$ (ZrA) 17.2 mg rac-SiMe$_2$ (2-methyl-4-phenyl-indenyl)$_2$ ZrCl$_2$ (ZrB)17.3 mg MAO solution (30 wt % in toluene, from 2.4 mL Albemarle SA)

Toluene 0.6 mL

Mixing was effected for 30 minutes whereafter the solution was used immediately.

20 g of the calcined silica at ambient temperature was placed in a small glass vessel equipped with a magnetic stirrer. The impregnation solution was added dropwise. Stirring was continued for 30 minutes at ambient temperature until all the solution had been added. With agitation, the vessel was heated to 70° C. and the impregnated silica carrier was dried at 20–5° C. under nitrogen flow for 45 minutes. The volume of solution added corresponded to 97% of the carrier's pore volume. By calculation the supported catalyst product comprised 0.0136 mmol ZrA/g carrier; 0.0136 mmol ZrB/g carrier; 5.5 mmol Al (from MAO)/g carrier.

A number of further dual impregnated carriers were prepared analogously to Example 3A using varying amounts of MAO, ZrA and ZrB.

(B) A dually impregnated carrier was prepared as in Example 3A using two separate solutions one containing all the ZrA and half the total MAO and toluene and the other all the ZrB and half the total MAO and toluene. The solutions were stirred separately for 40 minutes, then mixed for a short time and then immediately added to the carrier as in Example 3A. ZrA 0.0124 mmol/g carrier, ZrB 0.0124 mmol/g carrier, Al 5.0 mmol/g carrier.

(C) A dually impregnated carrier was prepared as in Example 3A. ZrA 0.0060 mmol/g carrier, ZrB 0.0180 mmol/g carrier, Al 5.5 mmol/g carrier.

(D) A dually impregnated carrier was prepared as in Example 3A. ZrA 0.0170 mmol/g carrier, ZrB 0.0169 mmol/g carrier, and Al 6.8 mmol/g carrier.

(E) A dually impregnated carrier was prepared as in Example 3A using 1.52 mL solution/g carrier, ie. 98% of pore volume. ZrA 0.0171 mmol/g carrier, ZrB 0.0169 mmol/g carrier, and Al 4.2 mmol/g carrier.

(F) Calcined carrier was wetted with toluene dropwise with stirring to the level of 0.53 mL toluene/g carrier. Stirring continued for 5 minutes more. The impregnation solution was then added as in Example 3A, at 1.18 mL/g carrier corresponding to a total liquid addition of 110% of pore volume. ZrA 0.0124 mmol/g carrier, ZrB 0.0124 mmol/g carrier, Al 5.5 mmol/g carrier.

(G) A singly impregnated carrier was prepared analogously to Example 3A but using only ZrB. The solution was added at 1.36 mL/g carrier, ie. to 88as of pore volume. ZrB 0.0248 mmol/g carrier, Al 5.5 mmol/g carrier.

(H) A singly impregnated carrier was prepared analogously to Example 3A but using only ZrA. The solution was added at 1.4 5 mL/ g carrier, ie. to 95% and of pore volume. ZrA 0.0240 mmol/g carrier, Al 5.5 mmol/g carrier.

(I) The calcined carrier of Example 3A was loaded with ZrA and ZrB sequentially. In the first step all ZrA and half the MAO and toluene were mixed and loaded onto the carrier at 1.50 mL/g carrier (ie. 97% pore volume) as in Example 3A. The loaded carrier was heated and dried as in Example 3A and a second impregnation solution containing all the ZrB and half the MAO and toluene was then added as in Example 3A at 1.50 mL/g carrier and the product was then again heated and dried as in Example 3A. ZrA 0 .0135 mmol/g carrier, ZrB 0.0135 mmol/g carrier, Al 5.5 mmol/g carrier.

(J) A dually loaded carrier was prepared as in Example 3I using only 50% of the MAO solution in each step. ZrA 0.0135 mmol/g carrier, ZrB 0.0135 mmol/g carrier, Al 5.5 mmol/g carrier.

EXAMPLE 4

Ethene Polymerization

Using the catalyst of Example 3, ethene polymerization was effected in a 2.2L steel reactor fitted with a stirrer an d temperature control apparatus.

Isobutane, a diluent, 1 liter, optionally containing hex-1-ene, and the catalyst was charged into the reactor and the temperature and pressure was then brought up to the desired values. Throughout the reaction run time, pressure was adjusted by ethene and as ethene was consumed more was added to maintain the pressure constant. The ethene feed contained some hydrogen to adjust the molecular weight of the polymer product. After the run time had elapsed, polymerization was stopped by venting the overpressure of the reactor.

Under the conditions used, most of the hydrogen added was consumed, and the amount of hydrogen added thus effectively controlled the polymer molecular weight.

The polymerization process conditions and parameters characterizing the polymer product are set out in Table 1 below:

TABLE 1

| | Run | | | | | | | | | |
|---|---|---|---|---|---|---|---|---|---|---|
| | 1 | 2 | 3 | 4 | 5 | 6 | 7 | 8 | 9 | 10 |
| [RUN] | 21125 | 21129 | 21152 | 21147 | 21016 | 21035 | 21144 | 21148 | 21048 | 21044 |
| Catalyst | 3A | 3A | 3A | 3A | 3B | 3C | 3C | 3C | 3C | 3D |
| Reactor Temperature (° C.) | 87 | 85 | 84 | 85 | 88 | 85 | 84 | 84 | 85 | 85 |
| Reactor Pressure (bar g) | 29 | 29 | 29 | 29 | 29 | 22 | 33 | 33 | 29 | 29 |
| 1-Hexene in isobutane | 0.2 | 0.2 | 0.2 | 0.0 | 0.2 | 0.2 | 0.0 | 0.0 | 0.2 | 0.2 |

TABLE 1-continued

| (wt %) | | | | | | | | | | |
|---|---|---|---|---|---|---|---|---|---|---|
| Catalyst weight (g) | 0.092 | 0.065 | 0.075 | 0.120 | 0.085 | 0.063 | 0.134 | 0.150 | 0.077 | 0.074 |
| $H_2$ concentration in Ethene feed (mol/ppm) | 2240 | 2240 | 2240 | 440 | 2350 | 2400 | 2240 | 2240 | 670 | 2400 |
| Run time (min.) | 60 | 60 | 60 | 71 | 61 | 59 | 120 | 80 | 60 | 60 |
| Polymer weight (g) | 167 | 124 | 160 | 282 | 154 | 50 | 141 | 137 | 57 | 60 |
| Yield (g PE/g cat.) | 1815 | 1908 | 2127 | 2350 | 1812 | 794 | 1052 | 913 | 740 | 811 |
| Activity (g PE/g cat./hr) | 1815 | 1908 | 2127 | 1986 | 1782 | 807 | 526 | 685 | 740 | 811 |
| MFR2 | 0.03 | 0.05 | 0.10 | — | — | — | — | 6.2 | — | — |
| MFR21 | 12 | 21 | 35 | 0.89 | 17 | 1.8 | 3.2 | — | 0.4 | 6.4 |
| FRR21/2 | 400 | 420 | 350 | — | — | — | — | — | — | — |
| Density (g/mL) | 0.949 | 0.951 | 0.955 | 0.948 | 0.955 | 0.940 | 0.946 | 0.956 | 0.941 | 0.953 |
| Mw (g/mol) | — | 194000 | 285000 | — | 155000 | — | — | — | — | 250000 |
| Mn (g/mol) | — | 9000 | 8000 | — | 9000 | — | — | — | — | 12000 |
| Mw/Mn | — | 21 | 23 | — | 17 | — | — | — | — | 20.8 |
| Peak Mw component A (D) | — | 18000 | 19000 | | 15000 | — | — | — | — | 17000 |
| Peak Mw component B (D) | — | 500000 | 600000 | | 400000 | — | — | — | — | 600000 |
| Ratio peak Mw A:B | — | 28 | 32 | — | 27 | — | — | — | — | 35 |
| $S_{log10}M_w$ | | 0.12 | | | | | | | | |
| Fraction >0.3 mm (wt %) | | 65 | | | | — | — | — | — | 82 |
| No. of particles measured | | 9 | | | | — | — | — | — | — |

| | Run | | | | | | | | |
|---|---|---|---|---|---|---|---|---|---|
| | 11 | 12 | 13* | 14* | 15* | 16* | 17* | 18* | 19 |
| [RUN] | 21052 | 21051 | 21003 | 20993 | 21061 | 21046 | 30092 | 30091 | 21053 |
| Catalyst | 3E | 3F | 3G | 3G | 3H | 3G + 3H | 3I | 3J | 3D |
| Reactor Temperature (° C.) | 85 | 85 | 90 | 88 | 88 | 85 | 85 | 85 | 85 |
| Reactor Pressure (bar g) | 29 | 29 | 29 | 29 | 29 | 29 | 29 | 29 | 29 |
| 1-Hexene in isobutane (wt %) | 0.2 | 0.2 | 0.2 | 0.2 | 0.2 | 0.2 | 0.2 | 0.2 | 0.2 |
| Catalyst weight (g) | 0.110 | 0.080 | 0.062 | 0.094 | 0.074 | 2 × 0.038 | 0.150 | 0.156 | 0.088 |
| $H_2$ concentration in Ethene feed (mol/ppm) | 2400 | 2400 | 2350 | 0 | 2400 | 2400 | 2100 | 2100 | 2400 |
| Run time (min.) | 60 | 59 | 60 | 60 | 60 | 59 | 60 | 60 | 60 |
| Polymer weight (g) | 75 | 88 | 68 | 105 | 216 | 115 | 248 | 249 | 100 |
| Yield (g PE/g cat.) | 682 | 1100 | 1097 | 1117 | 2911 | 1513 | 1653 | 1596 | 1136 |
| Activity (g PE/g cat./hr) | 682 | 1119 | 1097 | 1117 | 2911 | 1539 | 1653 | 1596 | 1136 |
| MFR2 | 0.76 | 0.06 | 0.06 | — | 0.93 | 23 | 0.43 | 17.5 | 0.01 |
| MFR21 | 67 | 15.5 | 9.6 | — | 14.5 | 380 | 60 | >400 | 6.8 |
| FRR21/2 | 88 | 258 | 160 | — | 16 | 17 | 140 | — | 680 |
| Density (g/mL) | 0.957 | 0.954 | — | — | 0.946 | 0.953 | 0.954 | 0.959 | 0.952 |
| Mw (g/mol) | 125000 | 225000 | 190000 | — | — | 187000 | 153000 | 93000 | 250000 |
| Mn (g/mol) | 8000 | 6900 | 13000 | — | — | 10000 | 8500 | 9600 | 10000 |
| Mw/Mn | 16 | 33 | 14.6 | — | — | 18 | 18 | 9.7 | 21 |
| Peak Mw component A (D) | 19000 | 16000 | — | — | — | 25000 | 23000 | 25000 | 18000 |
| Peak Mw component B (D) | 350000 | 500000 | 90000 | — | — | 450000 | 350000 | 400000 | 600000 |
| Ratio peak Mw A:B | 18 | 31 | — | — | — | 18 | 15 | 16 | 33 |
| $S_{log10}M_w$ | — | 0.17 | — | — | — | 0.48 | 0.28 | 0.35 | 0.06 |
| Fraction >0.3 mm (wt %) | — | 88 | — | — | — | — | — | | |
| No. of particles measured | — | — | — | — | — | 9 | — | — | |

*Comparative Examples

Comparative runs 17 and 18 (catalysts 3I and 3J) have the disadvantages of requiring extra impregnation and heating and drying steps in the sequential loading of two catalysts onto the carrier. Catalyst 3I moreover gave rise to fouling in the polymerization run, ie. in contrast to the other runs the polymer particles had clumped together in lumps and adhered to walls and agitator. Both runs 17 and 18 gave lower FRR2/21 values than the comparable runs using coimpregnated catalyst systems.

(FRR is a measure of the shear sensitivity of the viscosity from the shear rate. For specific purposes, like HDPE film, the shear sensitivity should be high. This gives a material that during the film blowing process is easy to extrude regarding throughput and has good film bubble stability as well as good mechanical properties of the film.)

EXAMPLE 5

Table of Complexes Used

Complex A=rac-$Me_2SiInd_2ZrCl_2$
Complex B=rac-$Me_2Si(2$-Me-4,5-Benzind$)_2ZrCl_2$
Complex C=rac-$Me_2Si(2$-Me-4-Ph-Ind$)_2ZrCl_2$ Table of Examples and Comparative Examples

| Complexes | Hydrogen added in polymerisation | Examples | Comparative examples |
|---|---|---|---|
| B + C | No hydrogen | 5762 | GPC results B: 5749; C: 5664 |
|  | Hydrogen | 5761 | GPC results B: 5659; C: 5715 |
| A + B + C | No hydrogen | 5772 | GPC results A: 5571; B: 5749; C: 5664 |

Catalyst Synthesis Procedure

Work was done under nitrogen atmosphere in a glove box. An amount of 35–50 mg of dry complex was added to a toluene solution of methyl aluminoxane (MAO), and optionally additional toluene was added. For multicomplex catalysts, th e individual complexes was dissolved successively in the same MAO solution. After the complexes) was completely dissolved, the solution was added drop by drop to ca. 2 g of silica. The volume of solution added did not exceed the pore volume of the silica (1.5 to 3 cm$^3$/g). Thereafter the silica powder was stirred for 15–30 minutes, then nitrogen purged and optionally heated and/or evacuated to remove the toluene. The resulting active catalyst was stored under nitrogen.

Polymerisation Procedure

A 2L steel autoclave reactor was inerted by heating to ca. 140° C. and nitrogen purged, thereafter cooled to room temperature. Ca. 150 mg of catalyst, optionally dispersed in an inert hydrocarbon, was injected into the reactor in countercurrent nitrogen flow. Then the reactor was closed, and optionally a pressure of hydrogen was added. Finally 1300 mL of liquid propylene was added. The polymerisation temperature was held at 10–15° C. for 10–15 minutes, then the reactor content was heated to 70° C. during ca. 2 min, and maintained at that temperature. Polymerisation was ended by depressuring the reactor. The polymer powder was dried and weighted.

Table of polymerisation tests

| Pol run no. | Date | Catalyst complex | H2 [bar] | Temp [° C.] | Time [min] | Amount [g] | Activity [gPP/g Cat*hr] | M.p. [° C.] | MFR [g/10 min] | Mw [g/mol] | Mn [g/mol] | Mw/Mn |
|---|---|---|---|---|---|---|---|---|---|---|---|---|
| 5761 | 15/11/96 | 1 | 0.11 | 70 | 45 | 402 | 2914 | 147.3 | 7.1 | 410000 | 115000 | 3.6 |
| 5762 | 15/11/96 | 1 | 0 | 70 | 55 | 390 | 2144 | 147.3 | 1 | 650000 | 205000 | 3.2 |
| 5772 | 04/12/96 | 2 | 0 | 70 | 60 | 400 | 1709 | 146.2 | n.a. | 315000 | 58000 | 5.4 |
| 5571* | 19/02/96 | 3 | 0 | 50 | 20 | 70 | 382 |  | >100 | 45000 | 18000 | 2.5 |
| 5588* | 07/03/96 | 4 | 0.02 | 70 | 35 | 433 | 742 | 134.8 | >500 |  |  |  |
| 5749* | 04/08/96 | 5 | 0 | 70 | 45 | n.a. | n.a. |  | 4.1 | 295000 | 115000 | 2.6 |
| 5732* | 04/08/96 | 6 | 0 | 70 | 30 | 180 | 1596 |  | 5.4 |  |  |  |
| 5559* | 14/02/96 | 7 | 0.02 | 70 | 90 | 196 | 367 | 144.9 | 5.0 | 300000 | 115000 | 2.6 |
| 5659* | 10/06/96 | 8 | 0.10 | 70 | 60 | 140 | 1164 |  |  | 230000 | 95000 | 2.4 |
| 5662* | 14/06/96 | 9 | 0 | 70 | 60 | 350 | 2069 | 150.1 | 0.02 | 535000 | 240000 | 2.2 |
| 5715* | 13/08/96 | 10 | 0.12 | 70 | 60 | 156 | 1040 | 151.9 | 28 | 185000 | 50000 | 3.7 |
| 5786* | 06/11/97 | 11 | 0.12 | 70 | 65 | 490 | 2750 | 151.4 | 15.5 |  |  |  |
| 5664* | 17/06/96 | 12 | 0 | 70 | 60 | 500 | 2660 |  | 0.04 | 715000 | 280000 | 2.6 |

Table of catalyst synthesis

| Catalyst ID and Complex | Complex amount [mg] | Amount of 30 w % MAO in toleune [ml] | Amount of extra toluene [ml] | Silica ID (Calcined in air at 600° C.) | Amount of silica | Pore volume of silica [cm$^3$/g] | Final catalyst composition (calc.) | | |
|---|---|---|---|---|---|---|---|---|---|
|  |  |  |  |  |  |  | Zr w % | Al w % | Toluene w % |
| 1 B + C | B: 18 C: 17 | 5 | 0.7 | PQ MS3030 | 1.92 | 3.1 | 0.16 (total) 0.084 (B) 0.073 (C) | 18.2 | 3.2 |
| 2 A + B + C | A: 14 B: 24 C: 13 | 5 0.042 | 1.7 (C) | PQ MS3040 | 2.007 | 3.3 | 0.15 (total) 0.063 (A) 0.084 (B) | 13.8 | 25 |
| 3 A | A: 9.1 | 9.2 | 0 | Grace 55SJ | 5.481 | 1.6 | 0.22 | 13.4 | 5.2 |
| 4 A | A: 31.0 | 3.0 | 0.5 | Grace 55SJ | 2.00 | 1.6 | 0.20 | 12.0 | 9.2 |
| 5 B | B: 16.46 | 3.1 | 0 | Grace 55SJ | 2.00 | 1.6 | 0.09 | 13.5 | 0.0 |
| 6 B |  |  |  |  |  |  |  |  |  |
| 7 B | B: 40 | 3.0 | 0 | Grace 55SJ | 2.00 | 1.6 | 0.21 | 12.6 | 6.0 |
| 8 B | B: 25 | 3.5 | 0 | Grace 55SJ (500° C. in nitrogen) | 2.0 | 1.6 | 0.13 | 14.0 | 5.4 |
|  | B: 37.17 | 3.5 | 0 | Grace 55SJ | 2.0 | 1.6 | 0.19 | 13.8 | 6.0 |
| 9 C | C: 40 | n.a. | n.a. | n.a. | n.a. | n.a | n.a. | n.a. | n.a. |
| 10 C | C: 30.0 | 3.4 | 0 | Grace 55SJ | 2.08 | 1.6 | 0.12 | 11.9 | 16.7 |

-continued

Table of catalyst synthesis

| Catalyst ID and Complex | Complex amount [mg] | Amount of 30 w % MAO in toleune [ml] | Amount of extra toluene [ml] | Silica ID (Calcined in air at 600° C.) | Amount of silica | Pore volume of silica [cm$^3$/g] | Final catalyst composition (calc.) | | |
|---|---|---|---|---|---|---|---|---|---|
| | | | | | | | Zr w % | Al w % | Toluene w % |
| 11 C | C: 30 | 3.0 | 0 | Grace sylopol 2104 | 2.0 | 1.6 | 0.15 | 13.0 | 2.2 |
| 12 C | C: n.a. | n.a. | n.a. | n.a | n.a. | n.a. | n.a. | n.a. | n.a. |

What is claimed is:

1. A process for the preparation of an olefin polymer wherein olefin polymerization is effected in a plurality of polymerization reaction stages in the presence of an olefin polymerization catalyst material, wherein said catalyst material is prepared by the simultaneous deposition of a catalyst or catalyst activator and the catalyst material onto a support, said catalyst material comprising at least two different types of active polymerization sites, wherein the catalyst material comprises at least two η-liganded catalysts, wherein each of said η-liganded catalysts comprises a complex of zirconium, hafnium or titanium.

2. A process as claimed in claim 1 wherein no one of the reaction stages is used to produce more than 95% by weight of the overall polymer.

3. A process as claimed in claim 2 wherein no one of the reaction stages is used to produce more than 70% by weight of the overall polymer.

4. A process as claimed in claim 1 wherein at least 10% by weight of the overall polymer is produced in each reaction stage.

5. A process as claimed in claim 1 wherein at least two different concentration levels of reactants are used in at least two reaction stages whereby at least one of the catalytic sites is caused to produce a different polymer in two different reaction stages.

6. A process as claimed in claim 1 wherein a multiplicity of reactors are used.

7. A process as claimed in claim 6 wherein two reactors are used.

8. A process as claimed in claim 1 wherein said co-catalyst is an aluminoxane.

9. A process as claimed in claim 8 wherein said co-catalyst is methylaluminoxane.

10. A process as claimed in claim 1 wherein the ratio between the different types of catalytic sites is substantially uniform over the support.

11. A process as claimed in claim 5 wherein a multiplicity of reactors are used.

12. A process as claimed in claim 5 wherein the ratio between the different types of catalytic sites is substantially uniform over the support.

13. A process as claimed in claim 4 for the copolymerization of ethylene and an α-olefin.

14. A process as claimed in claim 1 wherein said support has a pore volume and said co-catalyst or catalyst activator and said catalyst material to be loaded on said support are in a solution wherein the liquid content of said solution is less than 1.4 times the pore volume of said support.

15. A process as claimed in claim 14 wherein the liquid content of said solution is less than 1.0 times the pore volume of said support material.

* * * * *